US009616338B1

(12) United States Patent
Hooper et al.

(10) Patent No.: US 9,616,338 B1
(45) Date of Patent: Apr. 11, 2017

(54) VIRTUAL REALITY SESSION CAPTURE AND REPLAY SYSTEMS AND METHODS

(71) Applicant: VREAL INC, Seattle, WA (US)

(72) Inventors: Todd Hooper, Seattle, WA (US); Dan Rubenfield, Seattle, WA (US)

(73) Assignee: VREAL INC, Seattle, WA (US)

( * ) Notice: Subject to any disclaimer, the term of this patent is extended or adjusted under 35 U.S.C. 154(b) by 0 days.

(21) Appl. No.: 15/239,740

(22) Filed: Aug. 17, 2016

Related U.S. Application Data

(63) Continuation of application No. 15/057,003, filed on Feb. 29, 2016.

(51) Int. Cl.
| | |
|---|---|
| G09G 5/00 | (2006.01) |
| A63F 13/49 | (2014.01) |
| G06F 3/01 | (2006.01) |
| H04N 21/218 | (2011.01) |
| H04N 21/472 | (2011.01) |
| A63F 13/32 | (2014.01) |
| A63F 13/25 | (2014.01) |
| A63F 13/20 | (2014.01) |
| A63F 13/33 | (2014.01) |
| A63F 13/332 | (2014.01) |
| A63F 13/335 | (2014.01) |

(52) U.S. Cl.
CPC .............. *A63F 13/49* (2014.09); *A63F 13/20* (2014.09); *A63F 13/25* (2014.09); *A63F 13/32* (2014.09); *A63F 13/33* (2014.09); *A63F 13/332* (2014.09); *A63F 13/335* (2014.09); *G06F 3/011* (2013.01); *H04N 21/21805* (2013.01); *H04N 21/47217* (2013.01); *A63F 2300/404* (2013.01); *A63F 2300/407* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2007/0060343 A1* | 3/2007 | Sakaguchi | .............. A63F 13/10 463/31 |
| 2009/0199089 A1* | 8/2009 | Bulusu | ................ G06F 17/2229 715/255 |
| 2012/0093214 A1* | 4/2012 | Urbach | ................ H04N 19/507 375/240.01 |

(Continued)

*Primary Examiner* — Frank Chen
(74) *Attorney, Agent, or Firm* — AEON Law; Adam L. K. Philipp

(57) ABSTRACT

Provided herein are systems and methods for dynamically capturing the graphics engine function calls and other virtual reality object data as it is created during a virtual reality session by a client virtual reality device and creating a modified virtual reality session data stream based on the captured virtual reality session for rendering a virtual reality replay session of the captured virtual reality session by the same or another client virtual reality device (or by multiple client replay devices either independently and/or in a synchronized, interactive replay), where the modified virtual reality session data stream allows the virtual reality replay session to mimic the virtual reality scenes and environment created during the captured virtual reality session, while permitting a "third person" spectator perspective to be selected, and dynamically re-selected, during the course of the virtual reality replay session.

20 Claims, 17 Drawing Sheets

(56) References Cited

U.S. PATENT DOCUMENTS

| | | | |
|---|---|---|---|
| 2013/0335509 A1* | 12/2013 | Cafferata | G06Q 30/02 348/14.08 |
| 2014/0168229 A1* | 6/2014 | Ungureanu | G06T 1/20 345/505 |
| 2014/0194211 A1* | 7/2014 | Chimes | A63F 13/497 463/43 |

* cited by examiner

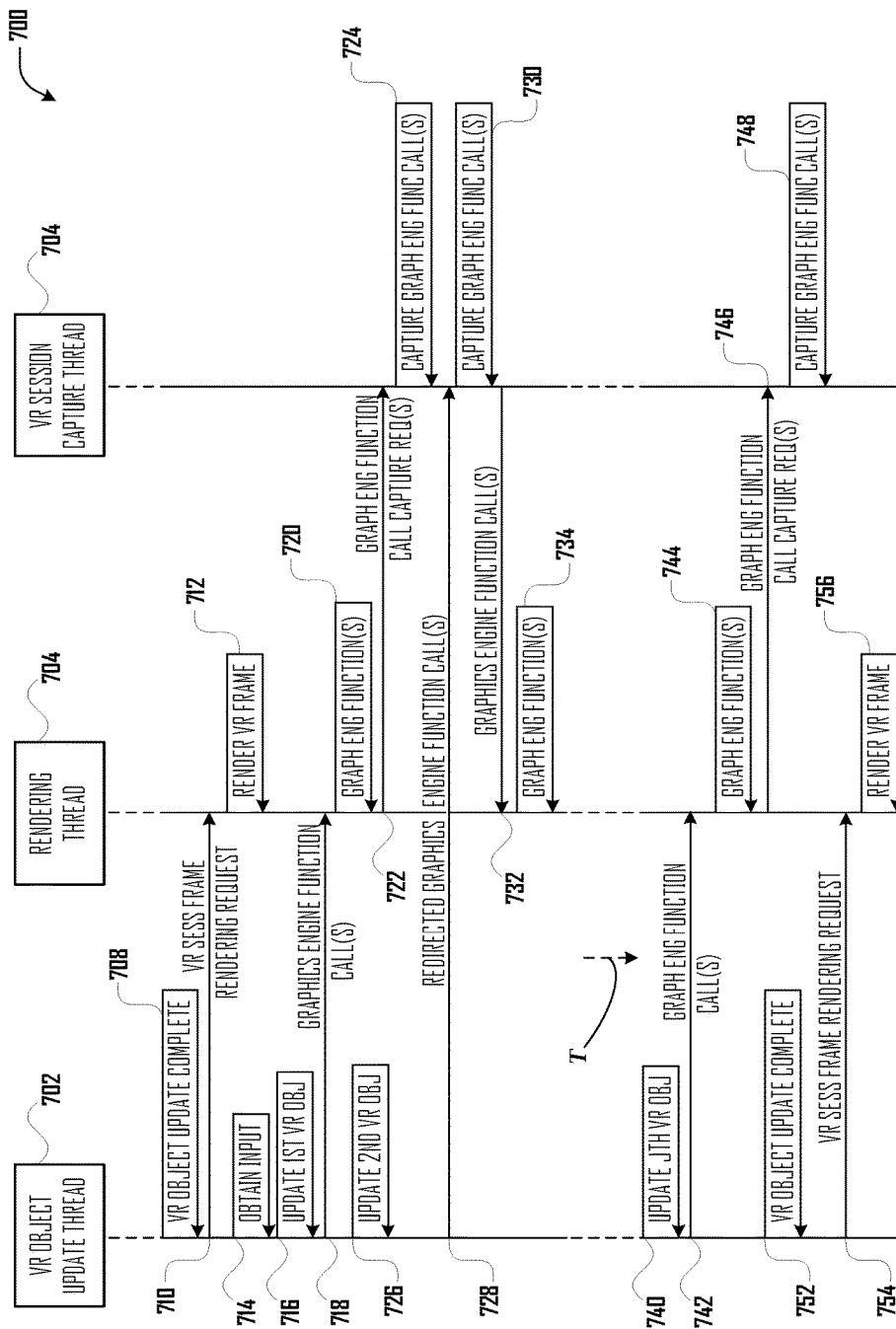

VIRTUAL REALITY SESSION CAPTURE AND REPLAY SYSTEMS AND METHODS

FIELD

The present disclosure relates to computing techniques for generating virtual reality sessions and more particularly, to systems and methods for capturing and replaying such virtual reality sessions from dynamically selectable viewing perspectives.

BACKGROUND

Virtual reality or virtual realities (VR) (also sometimes interchangeably referred to as immersive multimedia or computer-simulated reality) describes a simulated environment designed to provide a user with an interactive sensory experience that seeks to replicate the sensory experience of the user's physical presence in an artificial environment, such as a reality-based environment or a non-reality-based environment, such as a video game. A virtual reality may include audio and haptic components, in addition to a visual component.

The visual component of a virtual reality may be displayed either on a computer screen or with a stereoscopic head-mounted display (HMD), such as the Rift, a virtual reality head-mounted display headset developed by Oculus VR of Seattle, Wash. Some conventional HMDs simply project an image or symbology on a wearer's visor or reticle. The projected image is not slaved to the real world (i.e., the image does not change based on the wearer's head position). Other HMDs incorporate a positioning system that tracks the wearer's head position and angle, so that the picture or symbology projected by the display is congruent with the outside world using see-through imagery. Head-mounted displays may also be used with tracking sensors that allow changes of angle and orientation of the wearer to be recorded. When such data is available to the system providing the virtual reality environment, it can be used to generate a display that corresponds to the wearer's the angle-of-look at the particular time. This allows the wearer to "look around" a virtual reality environment simply by moving the head without the need for a separate controller to change the angle of the imagery. Wireless-based systems allow the wearer to move about within the tracking limits of the system. Appropriately placed sensors may also allow the virtual reality system to track the HMD wearer's hand movements to allow natural interaction with content and a convenient game-play mechanism However, a condition referred to as virtual reality sickness (also known as cybersickness) may occur when a user is exposed to a virtual reality environment. Virtual reality sickness can cause symptoms that are similar to the symptoms caused by motion sickness, such as general discomfort, headache, stomach awareness, nausea, vomiting, pallor, sweating, fatigue, drowsiness, disorientation, and apathy. Other symptoms may include postural instability and retching. Virtual reality sickness is distinguishable from motion sickness because it can be caused by the visually-induced perception of self-motion; real self-motion is not needed.

A significant aggravating factor in virtual reality sickness is whether the visual component of the virtual reality being experienced by the user represents is tied to the user's self-motion. In other words, if a user is "seeing" a virtual reality where the viewing-user's perspective is controlled by another user (or a computer), the viewing-user is more likely to develop symptoms of virtual reality sickness (this may be analogous to the anecdotally common real-world scenario of a passenger in a car developing symptoms of motion sickness while the driver of the car does not). For example, if the user controlling the perspective may unexpectedly swivel his or her head from side to side and the viewing-user is not expecting that sudden shift in perspective, virtual reality sickness may result.

Some conventional software applications, particularly video games where multiple players interact with a video game program within the same video game session, allow non-participating, "spectator," users to passively interact with the game session, e.g. by selectively navigating around the game session's environment, while the game session is ongoing.

Some conventional video games (and game engines) may include a static replay creation feature that records game-state data corresponding to a game session and allows a user to view a replay video of the game session within the video game. Third party tools that capture the display data generated during a game session and stores it in a video format for later playback are also known. Video-based replays created by the third party tools support sharing via online playback and commonly available video players but require much more storage space than replays created with in the context of the video game itself.

These exiting tools illustrate a recognition that video game users may desire to record a game session in order to replay at a later time or to distribute for others replay, e.g. for entertainment purposes, similar to viewing a recorded sporting event. Game replays may also be used in the prevention and detection of cheating or to develop skill at a video game, e.g. by watching better players and observing their techniques. Video game replays may also be used to raise stature in a particular game's user community, e.g. to establish rankings among players or to settle disputes. Video game replays are also used to produce replay reviews, i.e. a review of a game replay by an experienced player to determine what can be done to improve and expand upon the original player's skill.

Because many conventional video game replay techniques are designed to recreate the player's perspective, they cannot be used in a virtual reality implementation because a user experiencing a replay of another user's virtual reality perspective may be at a heightened risk of developing virtual reality sickness. Such concerns over virtual reality sickness may be a major barrier to applying conventional video game replay techniques to virtual reality video games.

Additionally, many virtual reality-based video games create expansive and detailed virtual environments which may not be sufficiently explorable using conventional player-perspective video replay techniques, such as static video capture.

BRIEF DESCRIPTION OF THE DRAWINGS

FIG. 7 illustrates a first exemplary series of data communications between execution threads instantiated in memory of an exemplary client virtual reality capture device in accordance with at least one embodiment.

DESCRIPTION

Figure 1:
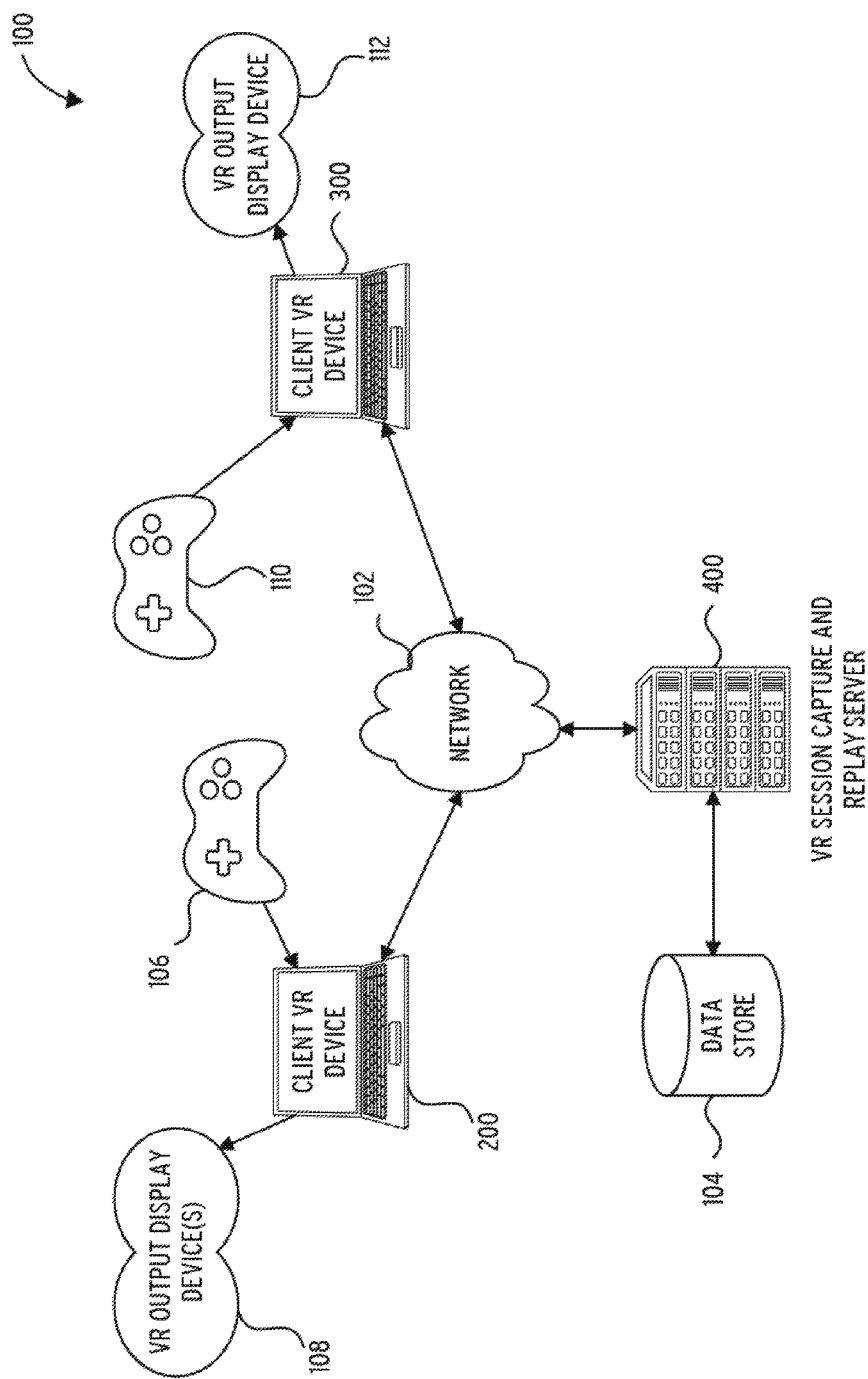
FIG. 1 illustrates exemplary network topology of a virtual reality session capture/replay system in accordance with at least one embodiment.

The detailed description that follows is represented largely in terms of processes and symbolic representations of operations by various computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein. For example, the embodiments set forth below are primarily described in the context of capturing and replaying visual/video data. However, these embodiments are exemplary and are in no way limited to visual/video data, and should be construed to include capturing and replaying audio data, haptic data, and the like.

In various embodiments described herein, the present methods and systems may be employed to capture and store a game-state data set corresponding to a VR game session and use the game-state data set to provide a virtual reality experience corresponding to a replay of the VR game session with a dynamically selectable spectator-perspective of the game session's virtual environment.

In an exemplary embodiment, a VR gaming replay service provider may provide systems and methods for: obtaining a game state data set as it is created during a virtual reality gaming session by a VR gaming device; creating a modified game-state data set based on the obtained game-state data set; and generating a data stream corresponding to the modified game-state data set for rendering a virtual reality replay session of the virtual reality gaming session by a client replay device (or by multiple client replay devices either independently and/or in a synchronized, interactive replay), where the modified game-state data set allows the virtual reality replay game session to mimic the virtual environment created during the VR game session, while permitting the client replay device to select (and dynamically re-select during the course of the replay game session) a "third person" spectator perspective. That is, a user/spectator of the replay game session may select his/her view point in the virtual environment created during the original game session, independent of the viewpoint of the original player.

In accordance with various aspects of the present embodiments, game event data for a game session may be obtained via at least two game-state data capture techniques operating in parallel on a remote server as the virtual reality game session is being created on a VR gaming device. In a first exemplary technique, the remote server may passively capture game function calls that are redirected from the VR gaming device to the remote server during the normal course of the virtual reality game session, e.g. via replay redirect instructions embedded into specific functions of the video game itself. In a second exemplary technique, the remote server may actively query the VR gaming device for game event data during the virtual reality game session, such as event data relating to the rotation, position and scale of three dimensional objects in the virtual environment (hereafter collectively referred to as positional event data and positional events, respectively).

In accordance with various aspects of some embodiments, the remote server may capture data corresponding to some game events data at a relatively high frame rate (e.g. the same frame rate as the original game session) and may capture data corresponding to other game events at a relatively low frame rate (e.g. 25%, 33%, 50%, 75%, etc. of the original game session frame rate). When generating a replay game session, in order for the replay game session to be capable of being rendered by a client replay device at the same frame rate as the original game session and with comparable visual quality, the remote server may apply one or more interpolation techniques to the game event data that was captured at the lower frame rate in order to match the corresponding gaps in the game event data that was captured at the high frame rate.

For example, the passive captured function call capture technique described above may capture data at the same frame rate as the game session is proceeding, while the active positional event querying technique described above may capture game event data at a relatively low frame rate, e.g. at 50% of the frame rate of the original game session. During generation of a replay game session at the same frame rate as the original game session, interpolation techniques may be used to provide estimated positional event data for those temporal interval, i.e. the display time of a single frame of a game session, where no positional event data was obtained directly.

An Exemplary Network Topology of a Virtual Reality Session Capture/Replay System FIG. 1 illustrates an exemplary network topology of a virtual reality session capture/replay system 100 in accordance with various embodiments. Client VR capture device 200, client VR replay device 300, and virtual reality session capture/replay server 400 are in data communication with a network 102. In various embodiments, network 102 may include the Internet, one or more local area networks ("LANs"), one or more wide area networks ("WANs"), cellular data networks, and/or other data networks. Network 114 may, at various points, be a wired and/or wireless network. Virtual reality session capture/replay server 400 may be in data communication with a data store 104.

In various embodiments, a client VR capture device 200 and a client VR replay device 300 may be networked client virtual reality devices. In the example shown in FIG. 1, client VR capture device 200 and client VR replay device 300 are depicted as having a laptop/notebook computer form factor. Depending on the embodiment, the hardware embodying client VR capture device 200 and/or client VR replay device 300 may have a form factor comparable to a general purpose computer (including "desktop," "laptop," "notebook," "tablet" computers, or the like); a mobile phone; "smart glasses," or other wearable client virtual reality device; a video game console; a specialized hardware device specifically designed for the implementation of the present systems and methods; or the like. However, as will be apparent from the following description, not all devices having such form factors will be suitable for implementing the present systems and methods. In various embodiments there may be many more instantiations of client VR capture device 200 and client VR replay device 300 than are shown in FIG. 1. The functional components of an exemplary, form-factor independent, client VR capture device 200 are described below in reference to FIG. 2. The functional components of an exemplary, form-factor independent, client VR replay device 300 are described below in reference to FIG. 3. An exemplary virtual reality input device(s) 106 and an exemplary VR output display device(s) 108 are connected to client VR capture device 200 for obtaining user input and providing visual output, respectively. An exemplary perspective selection input device 110 and an exemplary vr output display device 112 are connected to client VR replay device 300. In many embodiments, there may be additional input devices, such as a positional tracker (not shown), and output devices, such as headphones (not shown), and haptic feedback devices (not shown) connected to client VR capture device 200 and/or client VR replay device 300.

In various embodiments, virtual reality session capture/replay server 400 may be a networked client virtual reality device generally capable of accepting requests over network 102, e.g. from client VR capture device 200, client VR replay device 300, and/or other networked computing devices (not shown), and providing responses accordingly. The functional components of an exemplary virtual reality session capture/replay server 400 are described below in reference to FIG. 4.

An Exemplary Client Virtual Reality Capture Device

Figure 2:
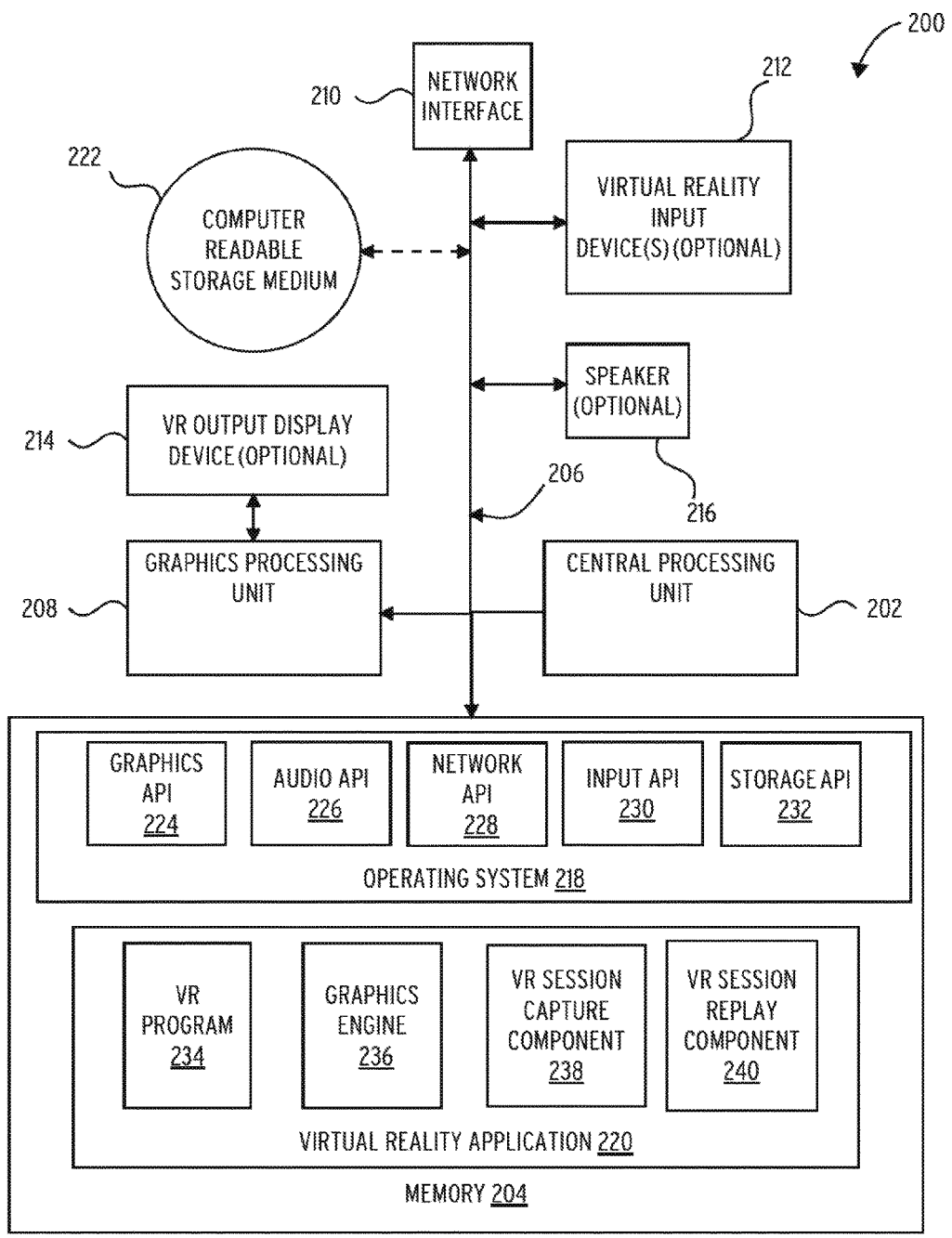
FIG. 2 illustrates several components of an exemplary client virtual reality capture device in accordance with at least one embodiment.

Referring to FIG. 2, several components of an exemplary client VR capture device 200 are illustrated. In some embodiments, a client gaming device may include many more components than those shown in FIG. 2. However, it is not necessary that all of these generally conventional components be shown in order to disclose an illustrative embodiment. As shown in FIG. 2, exemplary client VR capture device 200 includes a central processing unit 202 in data communication with memory 204 via an item 206.

Central processing unit 202 is an electronic circuit designed to carry out instructions of a computer program, e.g. obtained from memory 204, by performing the basic arithmetic, logical, control and input/output (I/O) operations specified by the program's instructions. Central processing unit 202 may have multiple processor cores (not shown). A multi-core processor is a single computing component with two or more independent data processing units (called "cores"), which are the units that read and execute program instructions. Multiple cores can process multiple instructions at the same time, increasing overall speed for applications amenable to parallel computing, such as virtual reality applications. An exemplary central processing unit 202 may be an Intel® Core™ i5-4590 Processor, manufactured by Intel Corporation of Santa Clara, Calif.

Memory 204 generally comprises some or all of random access memory (RAM), read-only memory (ROM), and/or a permanent mass storage device, such as a disk drive, flash memory, or the like.

Client VR capture device 200 may also include a network interface 210 for connecting to a network such as network 102, a virtual reality input device(s) (optional) 212 (or a user input port for connecting an external user input device, such as virtual reality input device(s) 106), a speaker (optional) 216 (or an output port (not shown) for connecting to an external audio device (not shown)), and the like.

In certain embodiments, client VR capture device 200 may include graphics processing unit 208. Graphics processing unit 208 is an electronic circuit designed to rapidly manipulate and alter electronic data to accelerate the creation of images in a frame buffer intended for output to a display. Graphics processing unit 208 may be in data communication with a VR output display device (optional) 214 (or an output port (not shown) for connecting to an external virtual reality display device such as VR output display device(s) 108). In some embodiments, speaker (optional) 216 and VR output display device (optional) 214 may be integrated into a single hardware device.

Memory 204 of exemplary client VR capture device 200 may store program code, executable by central processing unit 202, corresponding to an operating system 218, as well as program code corresponding to a virtual reality application 220 and other software applications (not shown).

Virtual reality application 220, and other software applications (not shown), as well as various data files (not shown) may be loaded into memory 204 via network interface 210 or via a computer readable storage medium 222, such as a hard-disk drive, a solid-state drive, an optical disc, a removable memory card, and/or the like.

In operation, operating system 218 manages the hardware and software resources of the client VR capture device 200 and provides common services and memory allocation for various software applications, such as virtual reality application 220. To enable software applications, such as virtual reality application 220 to interact with various hardware components of client VR capture device 200, such as network communications via network interface 210, obtaining input data via virtual reality input device(s) (optional) 212, rendering output data via VR output display device (optional) 214 and/or speaker (optional) 216, operating system 218 may provide a variety application program interfaces (APIs), such graphics API 224, such as the OpenGL (managed by Khronos Group of Beaverton, Oreg.), Direct3D (developed by Microsoft Corporation of Redmond, Wash.), proprietary APIs, and the like; an audio API 226; a network API 228; an input API 230, a storage API 232; and the like.

As is described in more detail below, virtual reality application 220 may include a VR program 234, such as a VR video game, a graphics engine 236, such as the Unity Engine (developed by Unity Technologies of San Francisco, Calif.), a VR session capture component 238, and (optionally) a vr session replay component 240. Instructions of VR program 234 may be executed by central processing unit 202 and may call various functions of graphics engine 236 in order to render visual data generated by the VR program. The functions of graphics engine 236 may be executed by central processing unit 202 and/or graphics processing unit 208.

Although an exemplary client VR capture device 200 has been described, a client gaming device may be any of a great number of computing devices capable of executing program code, such as the program code corresponding to operating system 218 and virtual reality application 220 and rendering the visual data generated by virtual reality application 220.

An Exemplary Client Virtual Reality Replay Device

Figure 3:
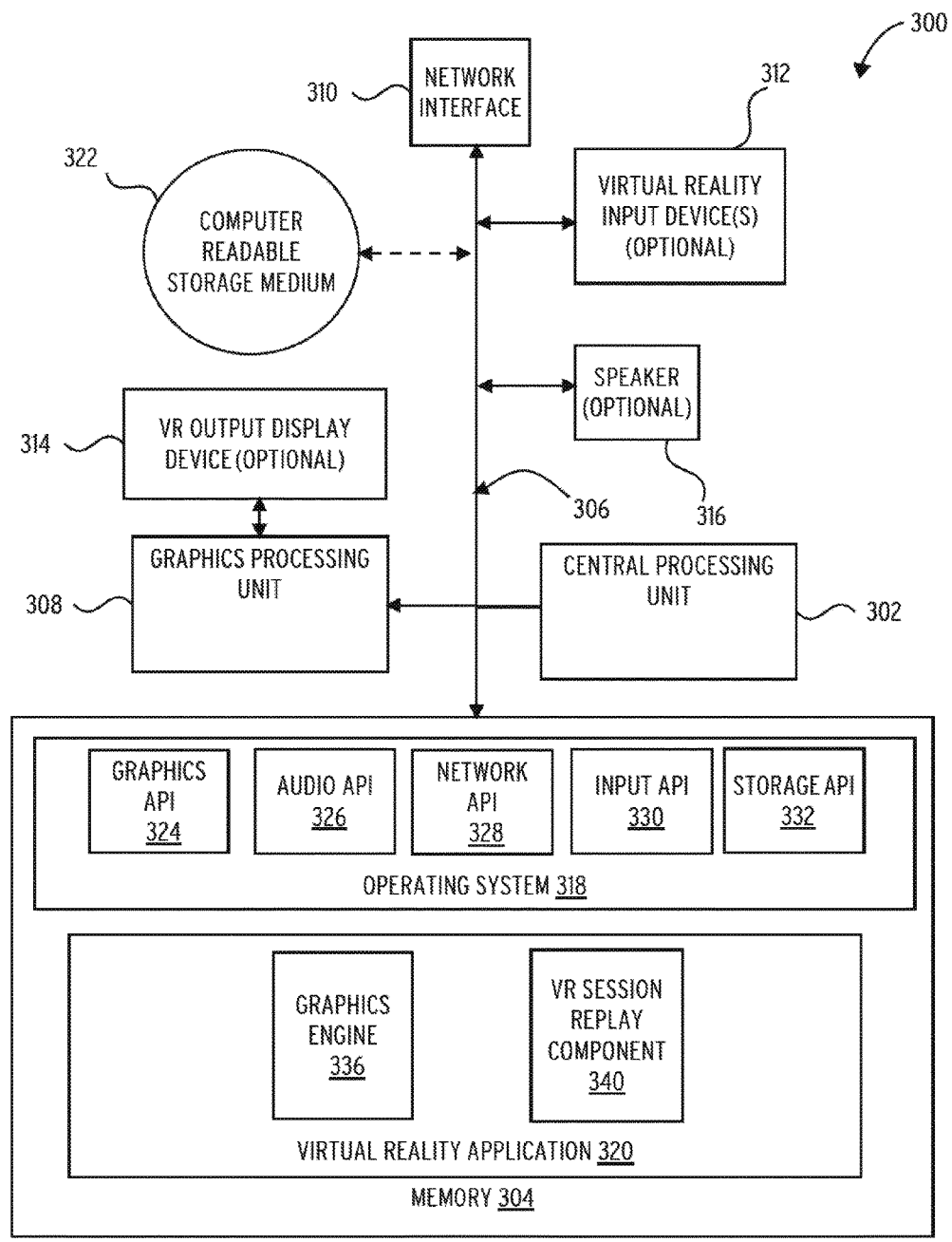
FIG. 3 illustrates several components of an exemplary client virtual reality replay device in accordance with at least one embodiment.

Referring to FIG. 3, several components of an exemplary client VR replay device 300 are illustrated. Client VR replay device 300 may include many of the same hardware and software components as client VR capture device 200. In some embodiments, a client VR replay device may include many more components than those shown in FIG. 3. However, it is not necessary that all of these generally conventional components be shown in order to disclose an illustrative embodiment.

As shown in FIG. 3, exemplary client VR replay device 300 includes a central processing unit 302 in data communication with memory 304 via a item 306. Central processing unit 302 is an electronic circuit designed to carry out instructions of a computer program, e.g. obtained from memory 304, by performing the basic arithmetic, logical, control and input/output (I/O) operations specified by the program's instructions. Memory 304 generally comprises some or all of random access memory (RAM), read-only memory (ROM), and/or a permanent mass storage device, such as a disk drive, solid-state device, flash memory, and/or the like.

Client VR replay device 300 may also include a network interface 310 for connecting to a network such as network 102, a virtual reality input device(s) (optional) 312, or a user input port for connecting an external user input device, such as perspective selection input device 110, a speaker (optional) 316, or an output port (not shown) for connecting to an external audio device (not shown)), and the like.

In certain embodiments, client VR replay device 300 may include graphics processing unit 308. Graphics processing unit 308 is an electronic circuit designed to rapidly manipulate and alter electronic data to accelerate the creation of images in a frame buffer intended for output to a display. Graphics processing unit 308 may be in data communication with a VR output display device (optional) 314, or an output port (not shown) for connecting to an external virtual reality display device such as vr output display device 112. In some embodiments, speaker (optional) 316 and VR output display device (optional) 314 may be integrated into a single hardware device.

Memory 304 of exemplary client VR replay device 300 may store program code, executable by central processing unit 302, corresponding to an operating system 318, as well as program code corresponding to a virtual reality application 320 and other software applications (not shown).

virtual reality application 320 and other software applications (not shown), as well as various data files (not shown) may be loaded into memory 304 via network interface 310 or via a computer readable storage medium 322, such as a hard-disk drive, a solid-state drive, an optical disc, a removable memory card, and/or the like.

In operation, operating system 318 manages the hardware and software resources of the client VR replay device 300 and provides common services and memory allocation for various software applications, such as virtual reality application 320. To enable software applications, such as virtual reality application 320 to interact with various hardware components of client VR replay device 300, such as network communications via network interface 310, obtaining input data via virtual reality input device(s) (optional) 312, rendering output data via VR output display device (optional) 314 and/or speaker (optional) 316, operating system 318 may provide a variety application program interfaces (APIs), such a graphics API 324, such as the OpenGL (managed by Khronos Group of Beaverton, Oreg.), Direct3D (developed by Microsoft Corporation of Redmond, Wash.), proprietary graphics APIs, and the like; an audio API 326; a network API 328; an input API 330, a storage API 332, and the like.

As is described in more detail below, virtual reality application 320 a graphics engine 336, such as the Unity Engine (developed by Unity Technologies of San Francisco, Calif.) and a VR session replay component 340. Instructions of virtual reality application 320 may be executed by central processing unit 302 and graphics processing unit 308 in order to render visual data generated by a VR session replay data stream (not shown).

Although an exemplary client VR replay device 300 has been described, a client VR replay device may be any of a great number of computing devices capable of executing program code, such as the program code corresponding to operating system 318 and rendering the visual data generated by virtual reality application 320.

An Exemplary Virtual Reality Session Capture/Replay Server

Figure 4:
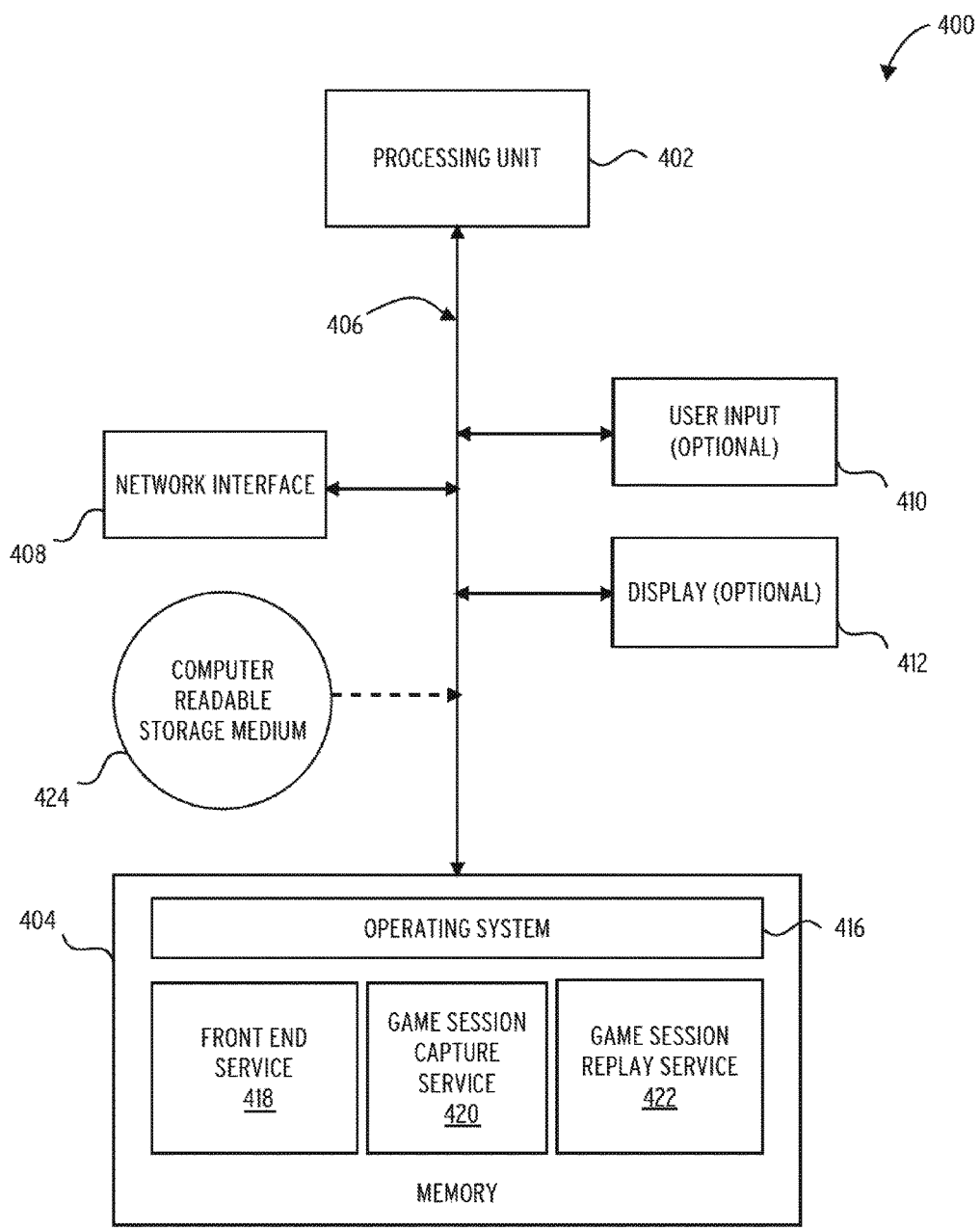
FIG. 4 illustrates several components of an exemplary virtual reality session capture/replay server in accordance with at least one embodiment.

Referring to FIG. 4, several components of an exemplary virtual reality session capture/replay server 400 are illustrated. In some embodiments, a virtual reality session capture/replay server may include many more components than those shown in FIG. 4. However, it is not necessary that all of these generally conventional components be shown in order to disclose an illustrative embodiment. As shown in FIG. 4, exemplary virtual reality session capture/replay server 400 includes a processing unit 402 in data communication with memory 404 via a bus 406. Memory 404 generally comprises some or all of random access memory (RAM), read-only memory (ROM), and/or a permanent mass storage device, such as a disk drive, flash memory, or the like.

Virtual reality session capture/replay server 400 may also include a network interface 408 for connecting to a network such as network 102 and a user input (optional) 410 (or a user input port for connecting an external user input device (not shown)) and/or a display (optional) 412 (or a display port for connecting to an external display device (not shown)).

Memory 404 of virtual reality session capture/replay server 400 may store program code, executable by processing unit 402, corresponding to an operating system 416, as well as program code corresponding to a front end service 418, a virtual reality session capture service 420, and a virtual reality session replay service 422.

These and other software components, as well as various data files (not shown) may be loaded into memory 404 via network interface 408 or via a selectively removable computer readable storage medium 424, such as an optical disc, memory card, or the like.

In operation, operating system 416 manages the hardware and software resources of virtual reality session capture/replay server 400. For hardware functions such as network communications via network interface 408, obtaining data via user input (optional) 410, and/or rendering data via display (optional) 412, and allocation of memory 404 to various resources, operating system 416 may act as an intermediary between software executing on virtual reality session capture/replay server 400 and the server's hardware.

Although an exemplary virtual reality session capture/replay server 400 has been described, a virtual reality session capture/replay server may be any of a great number of computing devices capable executing program code, such as the program code corresponding to operating system 416, front end service 418, virtual reality session capture service 420, and virtual reality session replay service 422.

An Exemplary Virtual Reality Session Capture Data Flow

Figure 5:
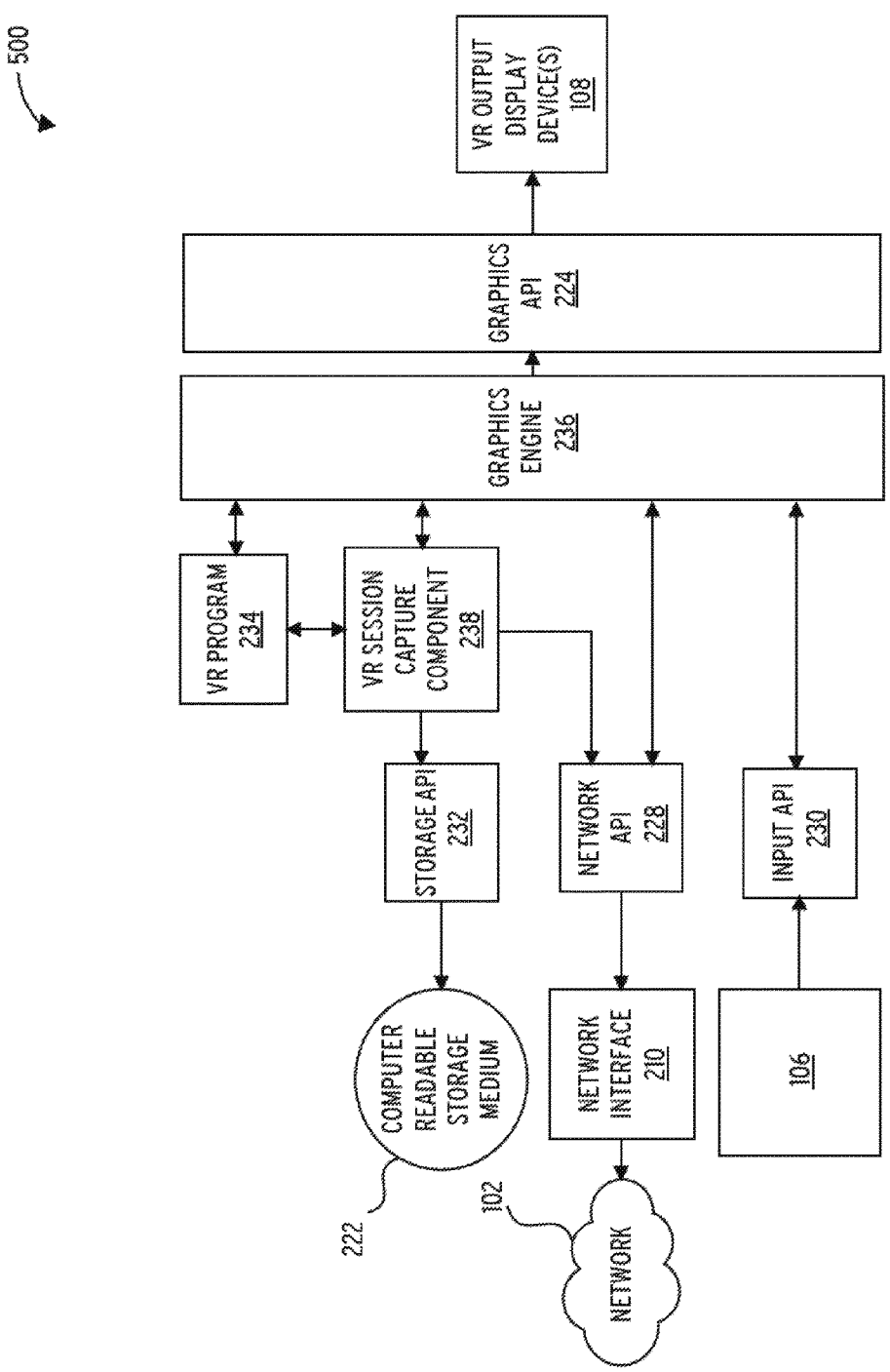
FIG. 5 illustrates a virtual reality session capture data flow between various hardware and software components of an exemplary client virtual reality capture device in accordance with at least one embodiment.

FIG. 5 illustrates an exemplary virtual reality session capture data flow 500 between various hardware and software components of an exemplary client VR capture device 200 and during a virtual reality capture session in accordance with various aspects of the present methods and systems.

Upon initiation of a virtual reality application, such as virtual reality application 220, e.g. responsive to a user command obtained via an input device, such as virtual reality input device(s) (optional) 212, instructions of VR program 234 and graphics engine 236 may be loaded into memory 204 and processed by one or more cores of central processing unit 202. If client VR capture device 200 is capable of multi-threading, e.g. because central processing unit 202 has multiple processing cores, the instruction execution underlying a virtual reality session may be performed across a plurality of parallel execution threads. For example, a VR object update thread 502 may process input, determine corresponding state updates for various virtual reality objects, and provide associated graphics engine function calls to a rendering thread 504. Rendering thread 504 may determine how the virtual reality objects should be rendered in accordance with the virtual reality objects' updated states and provide rending instructions to graphics API 224.

When initializing a virtual reality environment, VR object update thread 502 and rendering thread 504 may instantiate a plurality of virtual reality objects within an empty three dimensional virtual reality space. The virtual reality objects may have various defining characteristics, such as positional characteristics relating to the virtual reality object's relative position, rotation, and scale in the virtual reality space. Other defining characteristics of a virtual reality object may relate to:

1) the virtual reality object's simulated physical properties, such as: x, y, z dimensions, mass, friction, density, and the like,
2) the virtual reality object's physical appearance, such as: color, shading, texture, lighting and the like and/or
3) the virtual reality object's behavior, such as: animation instructions, artificial intelligence instructions, and the like.

Some of a plurality of virtual reality objects's characteristics may define relations to other virtual reality objects, e.g. a "floor" object may be related to one or more "wall" objects and the "wall" objects may also be related to a "ceiling" object.

VR object update thread 502 may then determine an initial viewing perspective for the virtual reality scene and cause rendering thread 504 to determine a projection of an initial virtual reality scene as depicted from the initial viewing perspective, and provide appropriate rendering instructions to graphics API 224 for rendering the projection as one or more two dimensional images corresponding to the first frame of the virtual reality session.

After a virtual reality scene has been fully initialized (i.e. an initial VR frame of the VR session has been rendered), for each subsequent frame of the virtual reality session, VR object update thread 502 may process external input, if any and update the state of each active VR object, as necessary.

To process external input, VR object update thread 502 may obtain input data via virtual reality input device(s) (optional) 212, which may be one or more of a keyboard, mouse, controller, positional detector, microphone, and the like, and/or via network 102. Such input data may, for example, be associated with a change in position of the observer's perspective (i.e. a change in the position/orientation of the virtual 'camera'), or of the observer's position (e.g. the observer's character moving or jumping, touching or grasping an object, firing a gun, and the like). In the second, state-updating step, VR object update thread 502 may update each VR object in the current virtual reality scene to account for the obtained input, as well as for the virtual reality scene's temporal advancement (e.g. a plurality of virtual reality objects may be in the process of moving, independently of an external input data). This may involve sub-steps relating to artificial intelligence, physics simulation, collision resolution, and the like, in order to determine any changes to the state of existing VR objects (and/or to determine if any new VR objects should be created). The update process may generate virtual reality output instructions corresponding to the current, updated state of each active VR object, including a plurality of graphics engine function calls provided to rendering thread 504. While the present description focuses on graphics engine function calls provided to rendering thread 504 to generate video output, the virtual reality output instructions may also correspond to audio output, haptic output, and the like.

Rendering thread 504 may obtain the plurality of graphics engine function calls and determine a new projection of the virtual reality scene as depicted from a current viewing perspective, and provide appropriate rendering instructions to graphics API 224 for rendering the new projection as one or more two dimensional images corresponding to a new frame of the virtual reality session.

In accordance with the present methods and systems, and as is described in more detail below with reference to FIG. 7 through FIG. 9, a VR session capture thread 506 may be initiated by VR session capture component 238 in parallel with the VR session thread and the rendering thread. VR session capture thread 506 may capture virtual realty object state information during the virtual reality session. VR session capture thread 506 may utilize one or more techniques for capturing the plurality of virtual reality objects state information, such as:

Whenever VR object update thread 502 provides a graphics engine function call to rendering thread 504, VR object update thread 502 may also provide a corresponding VR session function call capture request to VR session capture thread 506, the VR session function call capture request including data sufficient to recreate the graphics engine function call (e.g. the name of the function and parameters being passed to the function, if any);

Instead of calling graphics engine functions directly, VR object update thread 502 may provide VR session function call capture requests VR session capture thread 506 and VR session capture thread 506 may capture data sufficient to recreate the function call to the graphics engine (e.g. the name of the function and parameters being passed to the function, if any) and pass a redirected graphics engine function call to rendering thread 504; and/or VR session capture thread 506 may periodically request VR session event updates from VR object update thread 502 and/or rendering thread 504 and responsively obtain information relating to the current state of relevant VR objects (e.g. all VR objects, all currently active VR objects, or all VR objects whose state has changed since the last VR session event update.

Upon termination of the VR capture session, VR session capture thread 506 may assemble a virtual reality bitstream corresponding to the captured graphics engine function calls and captured VR object state changes, and store the assembled virtual reality bitstream, e.g. in computer readable storage medium 222, and/or provide the assembled virtual reality bitstream to virtual reality session capture/replay server 400 via network interface 210.

An Exemplary Virtual Reality Session Replay Data Flow

Figure 6:
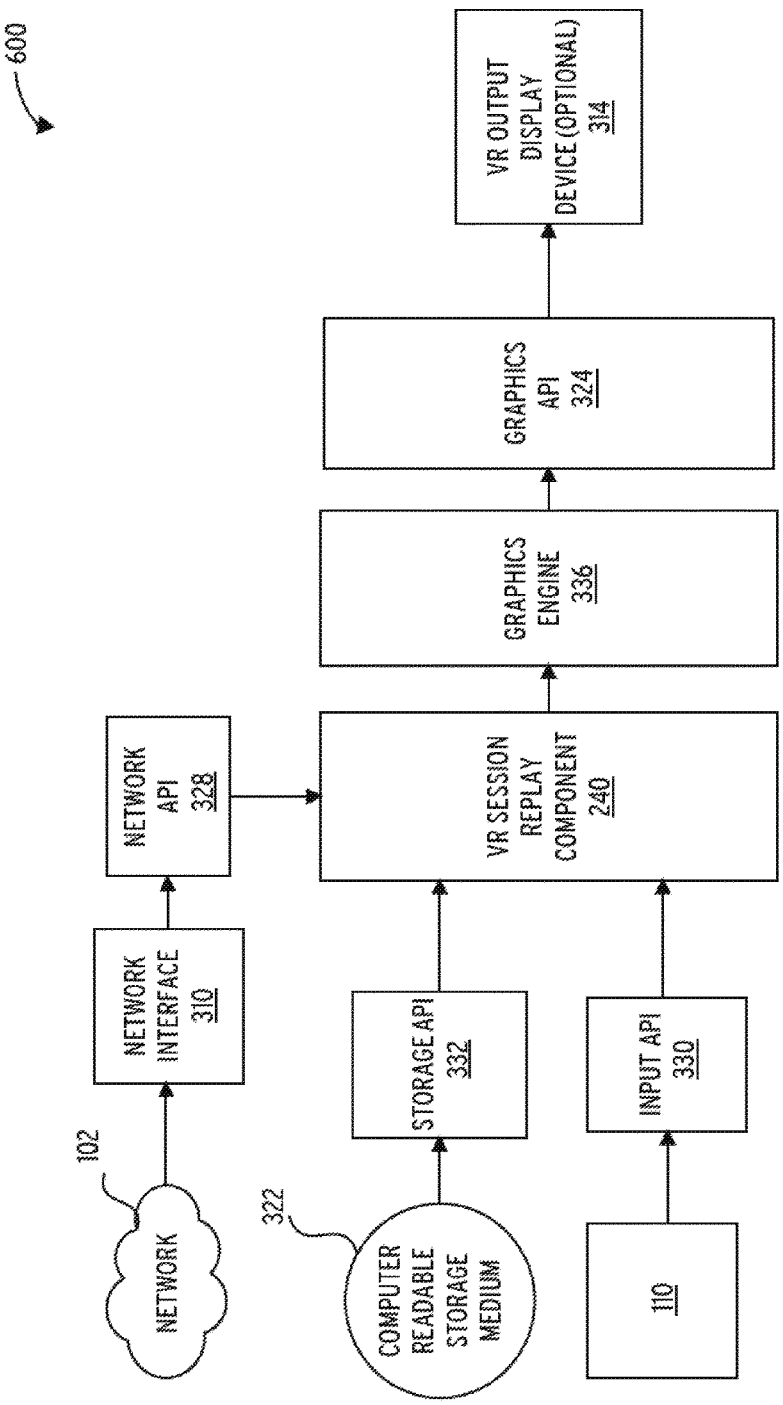
FIG. 6 illustrates a virtual reality session replay data flow between various hardware and software components of an exemplary client virtual reality replay device in accordance with at least one embodiment.

FIG. 6 illustrates an exemplary virtual reality session replay data flow 600 between various hardware and software components of an exemplary client VR replay device 300 during a virtual reality replay session in accordance with various aspects of the present methods and systems.

Upon initiation of a virtual reality application, such as virtual reality application 320, e.g. responsive to a user command obtained via an input device, such as virtual reality input device(s) (optional) 312 instructions of VR session replay component 340 and graphics engine 336 may be loaded into memory 304 and processed by one or more cores of central processing unit 302. If client VR replay device 300 is capable of multi-threading, e.g. because central processing unit 302 has multiple processing cores, the instruction execution underlying a virtual reality replay may be performed across a plurality of parallel execution threads. For example, a VR session replay thread 602 may process input, determine corresponding state updates for various virtual reality objects, and provide associated graphics engine function calls to a rendering thread 604. Rendering thread 504 may determine how the virtual reality objects should be rendered in accordance with the virtual reality objects' updated states and provide rending instructions to graphics API 324.

When initializing a virtual reality replay environment, VR session replay thread 602 and rendering thread 604 may instantiate a plurality of recreated virtual reality objects within an empty three dimensional virtual reality space, similar to the virtual reality environment and virtual reality objects described above.

VR session replay thread 602 may then determine an initial spectator viewing perspective for the recreated virtual reality scene and cause rendering thread 604 to determine a projection of a recreated initial virtual reality scene as depicted from the initial spectator viewing perspective, and provide appropriate rendering instructions to graphics API 324 for rendering the projection as one or more two dimensional images corresponding to the first frame of virtual reality replay session.

After virtual reality replay session has been fully initialized (i.e. an initial VR frame of the replay session has been rendered), for each subsequent frame of the virtual reality replay session, VR session replay thread 602 may process external input, if any, and provide captured graphics engine function calls to rendering thread 604.

To process external input, VR session replay thread 602 may obtain input data via virtual reality input device(s) (optional) 312, which may be one or more of a keyboard, mouse, controller, positional detector, microphone, and the like. Such input data may, for example, be associated with a change in position of the spectator's perspective (i.e. a change in the position/orientation of the virtual 'camera'). VR object update thread 502 may then provide the updated spectator perspective data and a plurality of graphics engine function calls in accordance with the virtual reality replay session's temporal advancement (e.g. during a replay session, the virtual reality objects of the virtual reality replay session will continue to interact as they did during the captured virtual reality session, independently of external input data). In some situations, VR session replay thread 602 may interpolate data, e.g. if at least some aspects of the virtual reality replay session are being rendered at a higher rate than those aspects were captured during the virtual reality capture session. While the present description focuses on graphics engine function calls provided to rendering thread 604 to generate video output, the virtual reality output instructions may also correspond to audio output, haptic output, and the like.

Rendering thread 604 may obtain the plurality of graphics engine function calls and determine a new projection of the virtual reality scene as depicted from a current spectator viewing perspective, and provide appropriate rendering instructions to graphics API 224 for rendering the new projection as one or more two dimensional images corresponding to a new frame of the virtual reality session.

A First Exemplary Series of Data Communications

FIG. 7 illustrates a first exemplary series of data communications 700 between VR object update thread 502, rendering thread 504, and VR session capture thread 506 instantiated in memory 204 of client VR capture device 200 during the course of a VR session, in accordance with the present methods and systems. Series of data communications 700 is not intended to depict all such communications that may occur during a VR session; series of data communications 700 is a simplified example intended to demonstrate the first and second exemplary techniques for capturing the plurality of virtual reality objects state information.

Client VR capture device 200 may instantiate VR object update thread 502, e.g. by causing central processing unit 202 to begin executing instructions of VR program 234. As is described above, during the virtual reality session, VR object update thread 502 may process external input, update the state of various VR objects in response to the external input, and provide graphics engine function calls to rendering thread 504.

During a VR session, VR object update thread 502 may determine 708 the state of all active VR objects have been updated in response to previously obtained external input and provide a VR session frame rendering request 710 to rendering thread 504. Rendering thread 504 may responsively render 712 a VR frame, e.g. via VR output display device (optional) 214, corresponding to the current state of the VR objects in the VR session.

VR object update thread 502 may then obtain 714 external input, e.g. via virtual reality input device(s) (optional) 212. VR object update thread 502 may then update 716 a first VR object in response to the external input and provide corresponding graphics engine function call(s) 718 to rendering thread 504.

In accordance with an aspect of the present methods and systems, rendering thread 504 may process 720 the called graphics engine function(s) and provide corresponding graphics engine function call capture request(s) 722 to VR session capture thread 506. Graphics engine function call capture request(s) 722 may include graphics engine function call data sufficient to recreate graphics engine function call(s) 718. VR session capture thread 506 may capture 724 graphics engine function call data, i.e. store the graphics engine function call data in a VR session bitstream stack associated with the VR session.

In accordance with another aspect of the present systems and methods, VR object update thread 502 may update 726 a second VR object and provide VR session capture thread 506 with redirected graphics engine function call(s) 728. VR session capture thread 506 may capture 730 graphics engine function call data corresponding to redirected graphics engine function call(s) 728) and provide rendering thread 504 with corresponding graphics engine function call(s) 732.

This process may continue over a time interval T, until VR object update thread 502 update 740 a jth VR object in response to the previously obtained external input and provide corresponding graphics engine function call(s) 742 to rendering thread 504. Rendering thread 504 may process 744 the called graphics engine function(s) and provide corresponding graphics engine function call capture request(s) 746 to VR session capture thread 506. Graphics engine function call capture request(s) 746 may include graphics engine function call data sufficient to recreate graphics engine function call(s) 742. VR session capture thread 506 capture 748 the graphics engine function call data.

After updating the jth VR object, VR object update thread 502 may determine 752 the state of all active VR objects have been updated in response to the previously obtained external input and provide a VR session frame rendering request 754 to rendering thread 504. Rendering thread 504 may responsively render 756 a VR frame, e.g. via VR output display device (optional) 214, corresponding to the current state of the VR objects in the VR session.

The communications described above may be repeated for some or all graphics engine function calls generated by VR object update thread 502. Upon termination of the VR session (not shown), VR object update thread 502 may provide a VR session termination request (not shown) to VR session capture thread 506. VR session capture thread 506 may responsively process the VR session bitstream stack associated with the now terminated VR session and store the VR session bitstream stack in computer readable storage medium 222 and or data store 104 (via network interface 210).

A Second Exemplary Series of Data Communications

Figure 8A:
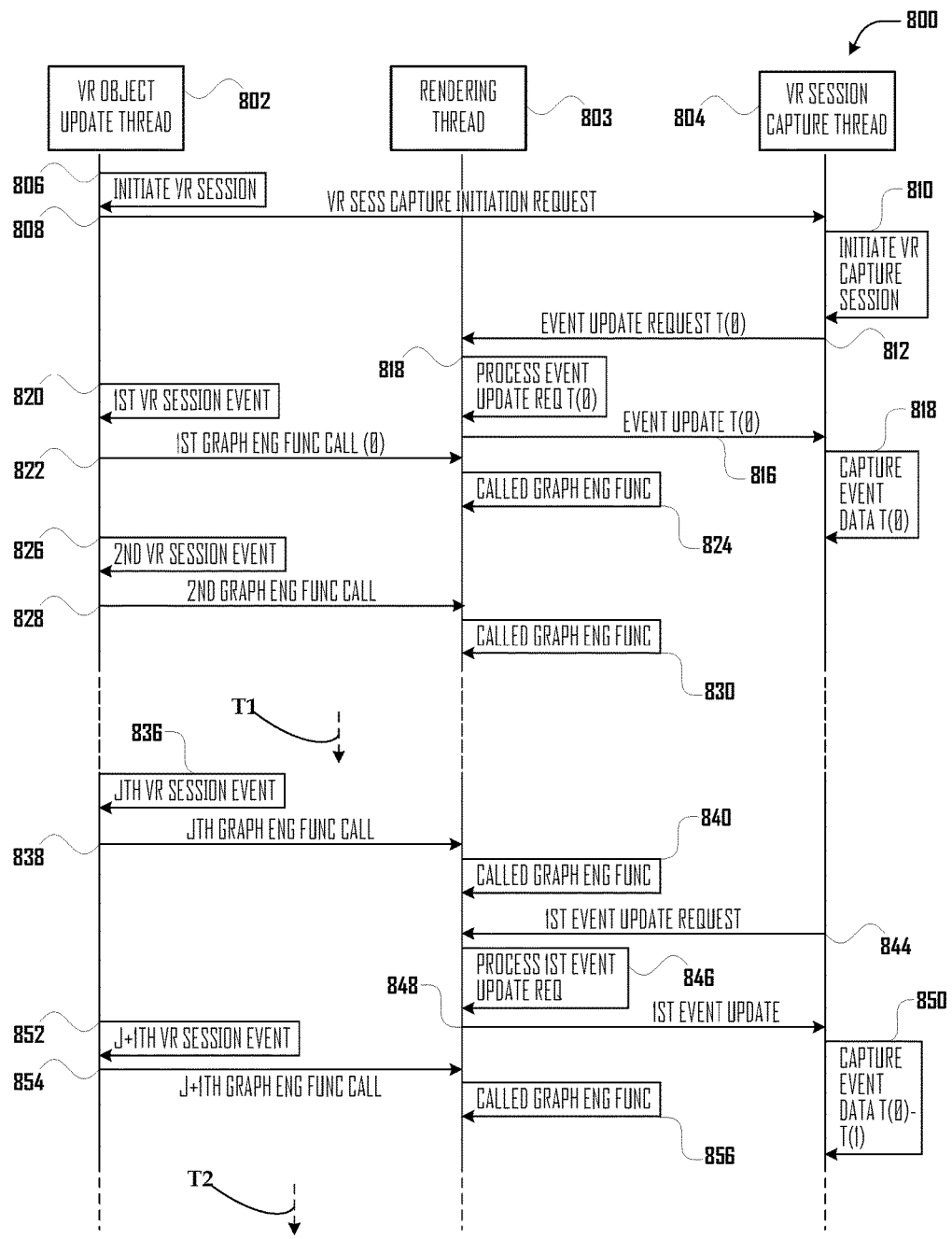
FIGS. 8A-8B illustrate a second exemplary series of data communications between execution threads instantiated in memory of an exemplary client virtual reality capture device in accordance with at least one embodiment.
Figure 8B:
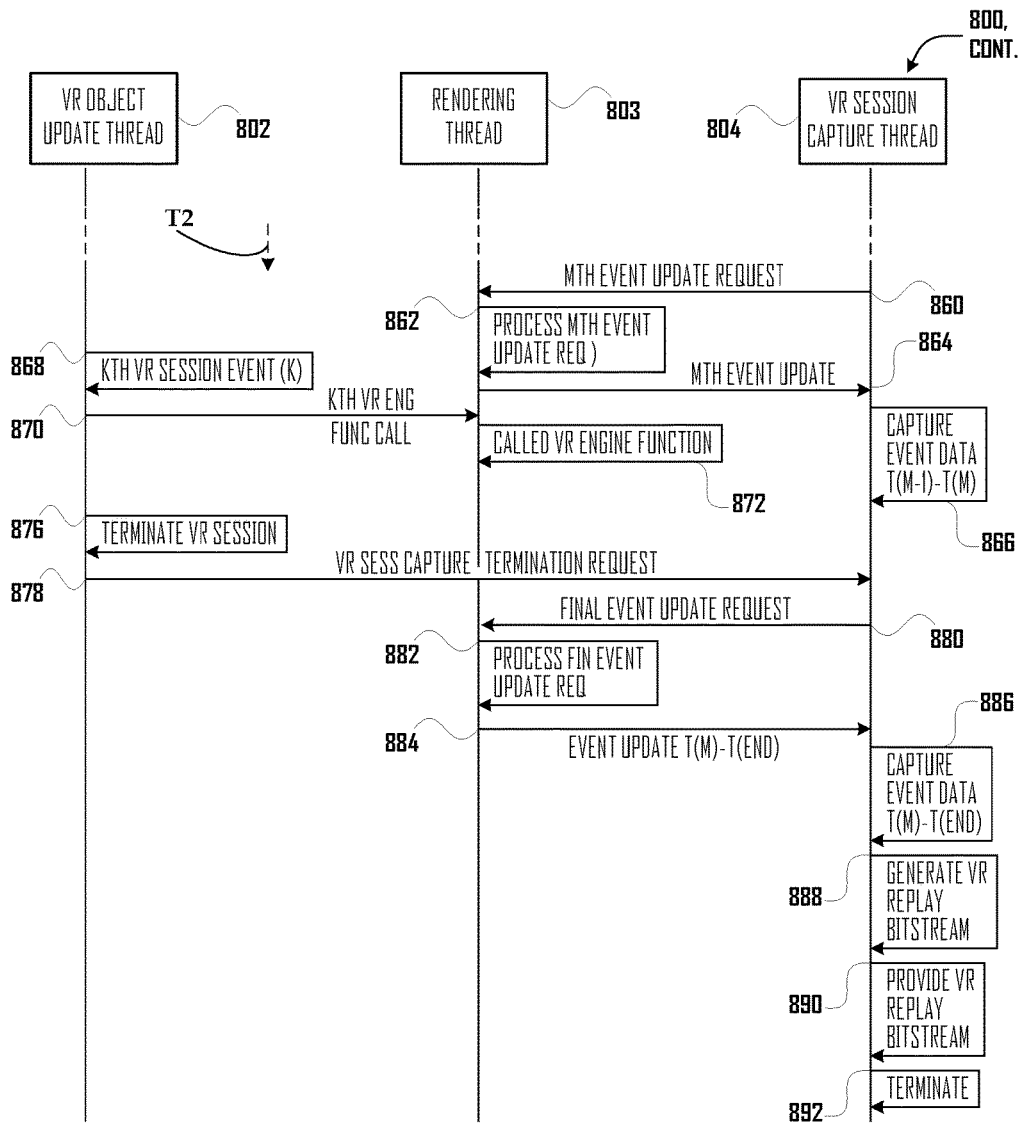

FIGS. 8A-8B illustrate a second exemplary series of data communications 800 occurring between parallel execution threads instantiated in memory 204 and executed by central processing unit 202 and/or graphics processing unit 208 in accordance with various aspects of the present methods and systems. Series of data communications 800 represents a 'pull' technique for capturing data generated by rendering thread 504 during a VR session. Virtual reality application 220 may create a VR object update thread 502 in memory 204 for causing central processing unit 202 (and/or graphics processing unit 208) to execute instructions of VR program 234. The execution sequence of the instructions of VR program 234 in VR object update thread 502 may vary responsive to input, e.g. input data obtained from virtual reality input device(s) (optional) 212 (and/or network interface 210).

Referring first to FIG. 8A, VR object update thread 502 may generate VR session events responsive to instructions of VR program 234 and external input, e.g. obtained from virtual reality input device(s) (optional) 212 and/or network interface 210. Various VR session events may generate function calls to rendering thread 504, thereby causing visual data to be generated, e.g by graphics processing unit 208, and rendered, e.g. by VR output display device (optional) 214. The visual data may correspond to a virtual reality scene including multiple virtual reality elements/objects (created, modified, and eliminated in accordance with VR session events), rendered with respect to a particular viewing perspective. The state of the virtual reality scene, in terms of both its contents, i.e. the virtual reality elements/objects and their characteristics (e.g. shape, color, texture, shading, and the like) and the viewing perspective with respect to which the virtual reality scene is rendered, may change over time responsive to instructions of VR program 234 and input obtained from virtual reality input device(s) (optional) 212 (and/or network interface 210). graphics processing unit 208 may sample the generated visual data at particular frame rate (e.g. ninety frames per second (FPS)) and provide an output signal to VR output display device (optional) 214, causing VR output display device (optional) 214 to render a current state of the virtual reality scene.

In accordance with the present methods and systems, upon instantiation, VR object update thread 502 may provide a VR session capture initiation request 808 to VR session capture component 238, which may cause VR session capture thread 506 to be created. VR session capture initiation request 808 may include a display frame rate for the VR session. As is described in more detail below, VR session capture thread 506 may request VR event updates from VR object update thread 502 and/or rendering thread 504 at periodic intervals (Tn). The interval period may be proportional to the provided display frame rate, e.g. a 1:1, 1:2, 1:3 ratio of intervals to displayed frames.

Upon initiation, VR session capture thread 506 may provide an initial event update request 812 to rendering thread 504. Rendering thread 504 may process 814 initial event update request 812 and responsively provide an initial event update response 816. Initial event update response 816 may include initial event data for VR session, such initial event data being sufficient to cause graphics engine 236 (and/or graphics engine 336) to recreate the current state of the virtual reality scene as of the time initial event update response 816 is generated. VR session capture thread 506 may capture 818 the initial event data for VR object update thread 502.

A first VR session event in VR object update thread 502 may generate 820 a first graphics engine function call 822 to rendering thread 504. Rendering thread 504 may perform 824 the called graphics engine function.

A second VR session event in VR object update thread 502 may generate 826 a second graphics engine function call 828 to rendering thread 504. Rendering thread 504 may perform 830 the called graphics engine function.

VR object update thread 502 may continue to generate function calls to rendering thread 504 as the virtual reality session advances.

A j'th VR session event in VR object update thread 502 may generate 836 a j'th graphics engine function call 838 to rendering thread 504. Rendering thread 504 may perform 840 the called graphics engine function.

Prior to a j+1'th VR session event occurring in VR object update thread 502, VR session capture thread 506 may detect the end of a first periodic interval T1, e.g. as measured from the time of obtaining initial event update response 816, and provide a first VR session event update request 844 to rendering thread 504.

Rendering thread 504 may process 846 first VR session event update request 844 and responsively provide first VR session event update 848 to VR session capture thread 506. First VR session event update 848 may include first periodic interval event data for the VR session, such first periodic interval event data being sufficient to cause graphics engine 236 (and/or graphics engine 336) to recreate the current state of the virtual reality scene generated by rendering thread 504 as of the end of the first periodic interval as measured by VR session capture thread 506. VR session capture thread 506 may capture 850 the first periodic interval event data provided by first VR session event update 848.

After processing first VR session event update request 844, VR object update thread 502 may generate 852 a j+1'th VR session event and provide a j+1'th graphics engine function call 854 to graphics engine 236, which may perform 856 the called graphics engine function and provide a j+1'th graphics engine function return 858, etc.

Referring now to FIG. 8B, VR session capture thread 506 may continue to provide VR object update thread 502 with event update requests at periodic intervals and to capture corresponding periodic interval event update data.

After detecting the end of an M'th periodic interval TM, VR session capture thread 506 may provide an M'th VR session event update request 860, to rendering thread 504.

VR object update thread 502 (and/or graphics engine 236) may process 862 M'th VR session event update request 860 and responsively provide m'th VR session event update 864 to VR session capture thread 506. M'th VR session event update 864 may include m'th periodic interval event data for the VR session, such m'th periodic interval event data being sufficient to cause graphics engine 236 (and/or graphics engine 336) to recreate the current state of the virtual reality scene generated by VR object update thread 502 as of the end of the m'th periodic interval as measured by VR session capture thread 506. VR session capture thread 506 may capture 866 the m'th periodic interval event data provided by m'th VR session event update 864.

VR object update thread 502 may generate 868 a k'th VR session event and provide a k'th graphics engine function call 870 to graphics engine 236, which may perform 872 the called graphics engine function.

Prior to VR session capture thread 506 detecting the end of an M+1'th periodic interval, VR object update thread 502 may begin termination 876 of the VR session and provide a VR session capture termination request 878 to VR session capture thread 506.

In certain embodiments, responsive to VR session capture termination request 878, VR session capture thread 506 may proceed directly to generating a VR replay bit stream, described below. In such embodiments, no additional event data is obtained from rendering thread 504 subsequent to m'th VR session event update 864.

In other embodiments, responsive to VR session capture termination request 878, VR session capture thread 506 may provide a final VR session event update request 880 to rendering thread 504. Rendering thread 504 may process 882 final VR session event update request 880 and responsively provide final VR session event update 884 to VR session capture thread 506. Final VR session event update 884 may include final event data for the VR session, such final event data being sufficient to cause graphics engine 236 (and/or graphics engine 336) to recreate the current state of the virtual reality scene generated by VR object update thread 502 just prior to termination. VR session capture thread 506 may capture 886 the final event data.

VR session capture thread 506 may then generate 888 a VR session replay bit stream from the captured VR session event data obtained during the VR session.

VR session capture thread 506 may provide 890 the VR session replay bitstream to computer readable storage medium 222, client VR replay device 300, and/or virtual reality session capture/replay server 400.

VR session capture thread 506 may then terminate 892.

A Third Exemplary Series of Data Communications

Figure 9:
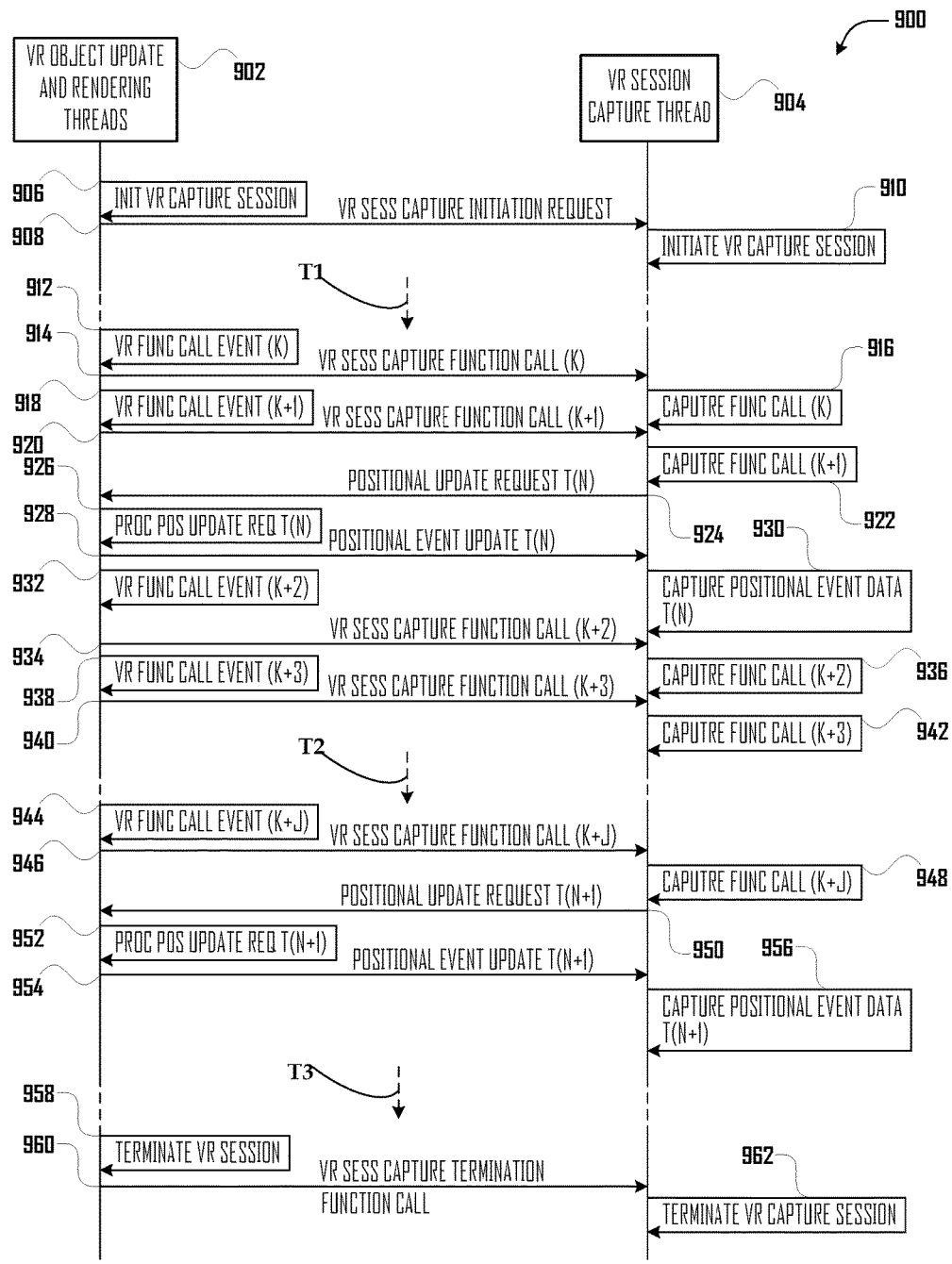
FIG. 9 illustrates a third exemplary series of data communications between execution threads instantiated in memory of an exemplary client virtual reality capture device in accordance with at least one embodiment.

FIG. 9 illustrates a third exemplary series of communications 900 occurring between execution threads instantiated in memory 204 and executed by central processing unit 202 and/or graphics processing unit 208 in accordance with various aspects of the present methods and systems. Series of communications 900 represents a hybrid 'push/pull' technique for capturing data generated during a VR session. Virtual reality application 220 may create a VR object update thread 502 and a rendering thread 504 (represented as in FIG. 9 as a combined VR session/rendering thread 902)

in memory 204 for causing central processing unit 202 (and/or graphics processing unit 208) to execute instructions of VR program 234. The execution sequence of the instructions of VR program 234 in VR session/rendering thread 902 may vary responsive to input, e.g. input data obtained from virtual reality input device(s) (optional) 212 (and/or network interface 210).

As has been described above, VR session/rendering thread 902 may generate VR session events responsive to instructions of VR program 234. Various VR session events may generate function calls to graphics engine (not shown), thereby causing visual data to be generated, e.g by graphics processing unit 208, and rendered, e.g. by VR output display device (optional) 214. The visual data may correspond to a virtual reality scene including multiple virtual reality elements/objects (created, modified, and eliminated in accordance with VR session events), rendered with respect to a particular viewing perspective. The state of the virtual reality scene, in terms of both its contents, i.e. the virtual reality elements/objects and their characteristics (e.g. shape, color, texture, shading, and the like) and the viewing perspective with respect to which the virtual reality scene is rendered, may change over time responsive to instructions of VR program 234 and input obtained from virtual reality input device(s) (optional) 212 (and/or network interface 210). graphics processing unit 208 may sample the generated visual data at particular frame rate (e.g. ninety frames per second (FPS)) and provide an output signal to VR output display device (optional) 214, causing VR output display device (optional) 214 to render a current state of the virtual reality scene.

In accordance with the present methods and systems, upon instantiation, VR session/rendering thread 902 may provide a VR session capture initiation request 908 to VR session capture component 238, which may cause VR session capture thread 506 to be created. VR session capture initiation request 908 may include a display frame rate for the VR session. As is described in more detail below, for each graphics engine function call, VR session/rendering thread 902 (or graphics engine 236) may provide a corresponding vr session capture function call to VR session capture thread 506. VR session capture thread 506 may also request VR event updates from VR session/rendering thread 902 at periodic intervals (Tn), e.g. to capture changes to the state of the virtual reality scene that may not be capturable via graphics engine function calls, such as relative position changes between various VR elements and/or objects within the virtual reality scene. The interval period may be proportional to the provided display frame rate, e.g. a 1:1, 1:2, 1:3 ratio of intervals to displayed frames.

At an arbitrary point in the VR session, VR session/rendering thread 902 may generate 912 a k'th graphics engine function call and provide a k'th graphic engine function call capture request 914 to VR session capture thread 506. K'th graphic engine function call capture request 914 may include function call capture data, including a function identifier and one or more function parameters. VR session capture thread 506 may capture 916 the function call capture data.

VR session/rendering thread 902 may then generate 918 a k+1'th graphics engine function call and provide a k+1'th graphic engine function call capture request 920 to VR session capture thread 506. K+1'th graphic engine function call capture request 920 may include function call capture data, including a function identifier and one or more function parameters. VR session capture thread 506 may capture 922 the function call capture data.

Prior to a k+2'th graphics engine function call being generated by VR session/rendering thread 902, VR session capture thread 506 may detect the end of a periodic interval Tq and provide a q'th plurality of positional update requests 924 to VR session/rendering thread 902.

VR session/rendering thread 902 may process 926 q'th plurality of positional update requests 924 and responsively provide a qth positional update response 928 to VR session capture thread 506. Qth positional update response 928 may include q'th periodic interval event data for the VR session, such q'th periodic interval event data being sufficient to update the positional state of the virtual reality elements/objects making up the current virtual reality scene being generated by VR object update thread 502 from the previous, q−1'th periodic interval. VR session capture thread 506 may capture 930 the q'th periodic interval event data provided by qth positional update response 928.

After processing q'th plurality of positional update requests 924, VR session/rendering thread 902 may generate 932 a k+2'th VR function call and provide a k+2'th graphic engine function call capture request 934 to VR session capture thread 506. K+2'th graphic engine function call capture request 934 may include function call capture data, including a function identifier and one or more function parameters. VR session capture thread 506 may capture 936 the function call capture data.

VR session/rendering thread 902 may then generate 938 a k+3'th graphics engine function call and provide a k+3'th graphic engine function call capture request 940 to VR session capture thread 506. K+3'th graphic engine function call capture request 940 may include function call capture data, including a function identifier and one or more function parameters. VR session capture thread 506 may capture 942 the function call capture data.

Some time later, VR session/rendering thread 902 may generate 944 a k+z'th graphics engine function call and provide a k+z'th graphics engine function call capture request 946 to VR session capture thread 506. K+z'th graphics engine function call capture request 946 may include function call capture data, including a function identifier and one or more function parameters. VR session capture thread 506 may capture 948 the function call capture data.

Prior to a k+z+1'th graphics engine function call occurring in VR session/rendering thread 902, VR session capture thread 506 may detect the end of the q'th periodic interval, e.g. as measured from the time of obtaining qth positional update response 928 and provide a q+1'th plurality of positional update requests 950 to VR session/rendering thread 902.

VR session/rendering thread 902 may process 952 q+1'th plurality of positional update requests 950 and responsively provide a q+1'th positional update response 954 to VR session capture thread 506. Q+1'th positional update response 954 may include q+1'th periodic interval event data for the VR session, such q+1'th periodic interval event data being sufficient to update the positional state of the virtual reality elements/objects making up the current virtual reality scene being generated by VR object update thread 502 from the previous, q'th periodic interval. VR session capture thread 506 may capture 956 the q+1'th periodic interval event data provided by q+1'th positional update response 954.

Although only five graphics engine function calls are explicitly illustrated (k, k+1, k+2, k+3, and k+z) during the q'th periodic interval, in may embodiments and applications, there will be many more graphics engine function calls during an arbitrary periodic interval (i.e. the value of z may be on the order of thousands, tens of thousands, etc).

The VR session may continue as illustrated above until VR session/rendering thread 902 obtain 958 a termination request. VR session/rendering thread 902 may provide a VR session capture termination request 960 to VR session capture thread 506.

VR session capture thread 506 may then generate 962 a VR session replay bit stream from the captured VR session event data obtained during the VR session.

VR session capture thread 506 may provide VR session replay bitstream 964 to computer readable storage medium 222. VR session capture thread 506 may also provide VR session replay bitstream 964 to client VR replay device 300 and/or virtual reality session capture/replay server 400 via network interface 210.

VR session capture thread 506 may then terminate 966 the VR capture session.

A Fourth Exemplary Series of Data Communications

Figure 10:
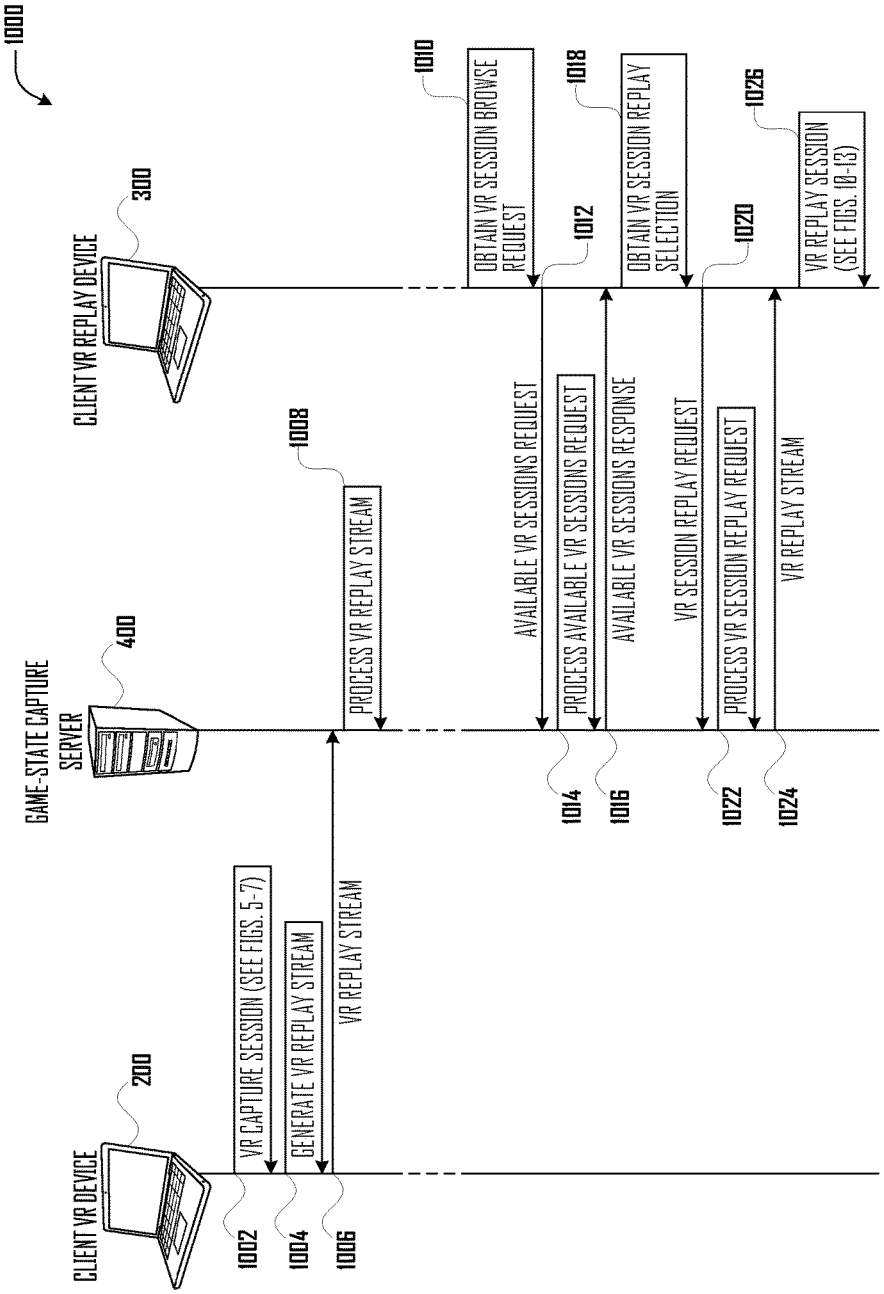
FIG. 10 illustrates a fourth exemplary series of data communications between an exemplary client virtual reality capture device, an exemplary virtual reality session capture/replay server, and an exemplary client virtual reality replay device in accordance with at least one embodiment.

FIG. 10 illustrates an exemplary series of communications 1000 between client VR capture device 200, client VR replay device 300, and virtual reality session capture/replay server 400 in accordance with various embodiments of the present methods and systems.

Client VR capture device 200 may capture 1002 a VR session, e.g. in accordance with one or more of the techniques described above with reference to FIG. 7-FIG. 9. Client VR capture device 200 may generate 1004 a VR replay stream and provide VR replay stream 1006 to virtual reality session capture/replay server 400. Virtual reality session capture/replay server 400 may process 1008 the VR replay stream, e.g. by creating a stored copy of the VR replay stream in data store 104.

At a later time, client VR replay device 300 may obtain 1010 a request for VR sessions available for replay. Client VR replay device 300 may accordingly provide an available VR replay sessions request 1012 to virtual reality session capture/replay server 400. Virtual reality session capture/replay server 400 may process 1014 the available VR sessions request and provide an available VR replay sessions response 1016 to client VR replay device 300.

Client VR replay device 300 may then obtain 1018 a VR session replay selection and provide a VR replay session request 1020 to virtual reality session capture/replay server 400. Virtual reality session capture/replay server 400 may process 1022 the VR replay session request and responsively provide a VR replay stream 1024 to client VR replay device 300.

Client VR replay device 300 may use VR replay stream 1024 to generate 1026 a VR replay session, e.g. using one of the techniques described below in reference to FIG. 11-FIG. 12 (deleted).

A Fifth Exemplary Series of Data Communications

Figure 11:
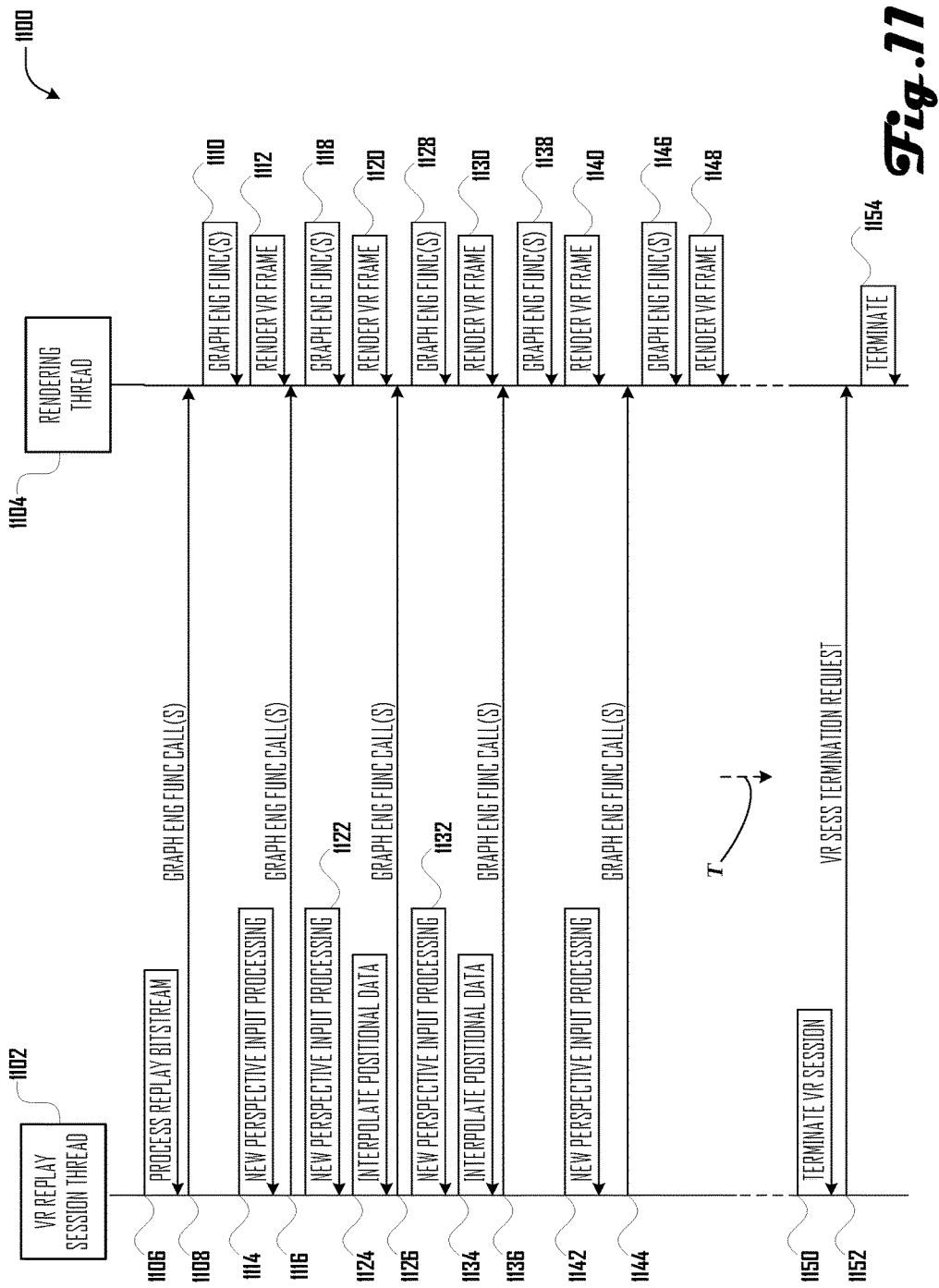
FIG. 11 illustrates a fifth exemplary series of data communications between execution threads instantiated in memory of an exemplary client virtual reality replay device in accordance with at least one embodiment.

FIG. 11 illustrates an exemplary series of communications 1100 corresponding to a VR replay session in accordance with aspects of the present methods and systems and occurring between execution threads instantiated in memory 304 of client VR replay device 300 and executed by central processing unit 302 and/or graphics processing unit 308 in accordance with various aspects of the present methods and systems. Series of communications 1100 illustrates a VR session replay counterpart of the 'push/pull' technique for capturing VR session data generated, described above in reference to FIG. 9. Virtual reality application 320 may create a VR replay session thread 1102 in memory 304 for causing central processing unit 302 (and/or graphics processing unit 308) to execute instructions of VR session replay component 340.

As is described below, VR replay session thread 1102 may process a VR replay stream and generate a plurality of function calls to a rendering thread 1104, thereby causing visual data to be generated, e.g by graphics processing unit 208, and rendered, e.g. by VR output display device (optional) 214. The visual data may correspond to a recreated virtual reality scene including recreations of virtual reality based on graphics engine function calls captured during a previous VR session, rendered with respect to a newly selected viewing perspective. The state of the virtual reality scene, in terms of both its contents, i.e. the virtual reality elements/objects and their characteristics (e.g. shape, color, texture, shading, and the like), and the viewing perspective with respect to which the virtual reality scene is rendered, may change over time. The sequence and content of the recreated graphics engine function calls provided to graphics engine 336 by VR session replay component 340 may vary responsive to input, e.g. input data obtained from virtual reality input device(s) (optional) 312 and/or network interface 310.) Graphics processing unit 308 may sample the generated visual data at particular frame rate (e.g. thirty FPS, sixty FPS, ninety FPS) and provide an output signal to VR output display device (optional) 314 causing VR output display device (optional) 314 to render a current state of the virtual reality scene.

In accordance with the present methods and systems, upon instantiation, VR replay session thread 1102 may obtain and process 1106 a previously captured VR replay session bitstream, e.g. from computer readable storage medium 322, client VR capture device 200, virtual reality session capture/replay server 400, or the like. VR replay session thread 1102 may then begin providing graphics engine function call(s) 1108 to rendering thread 1104 in order to initiate the VR replay session. Rendering thread 1104 may process 1110 the obtained graphics engine function call(s) 1108 and render 1112 an initial VR replay frame.

VR replay session thread 1102 may obtain and process 1114 new perspective input, if any, and provide graphics engine function call(s) 1116 to rendering thread 1104. Rendering thread 1104 may process 1118 the obtained graphics engine function call(s) 1116 and render 1120 a subsequent VR replay frame.

VR replay session thread 1102 may obtain and process 1122 new perspective input, if any, and interpolate 1124 positional data for any active VR objects, e.g. using captured positional data from earlier and/or later in the captured VR session. VR replay session thread 1102 may then provide graphics engine function call(s) 1126 to rendering thread 1104. Rendering thread 1104 may process 1128 the obtained graphics engine function call(s) and render 1130 a subsequent replay frame.

VR replay session thread 1102 may obtain and process 1132 new perspective input, if any, and interpolate 1134 positional data for any active VR objects, e.g. using captured positional data from earlier and/or later in the captured VR session. VR replay session thread 1102 may then provide graphics engine function call(s) 1136 to rendering thread 1104. Rendering thread 1104 may process 1138 the obtained graphics engine function call(s) and render 1140 a subsequent replay frame.

VR replay session thread 1102 may obtain and process 1142 new perspective input, if any, and provide graphics engine function call(s) 1144 to rendering thread 1104. Rendering thread 1104 may process 1146 the obtained graphics engine function call(s) 1116 and render 1148 a subsequent VR replay frame.

This process may continue until the end of the VR replay session, at which time VR replay session thread 1102 may terminate 1150 the VR replay session and provide a VR session termination request 1152 to rendering thread 1104. Rendering thread 1104 may then terminate 1154.

A Virtual Reality Session Capture Routine

Figure 12:
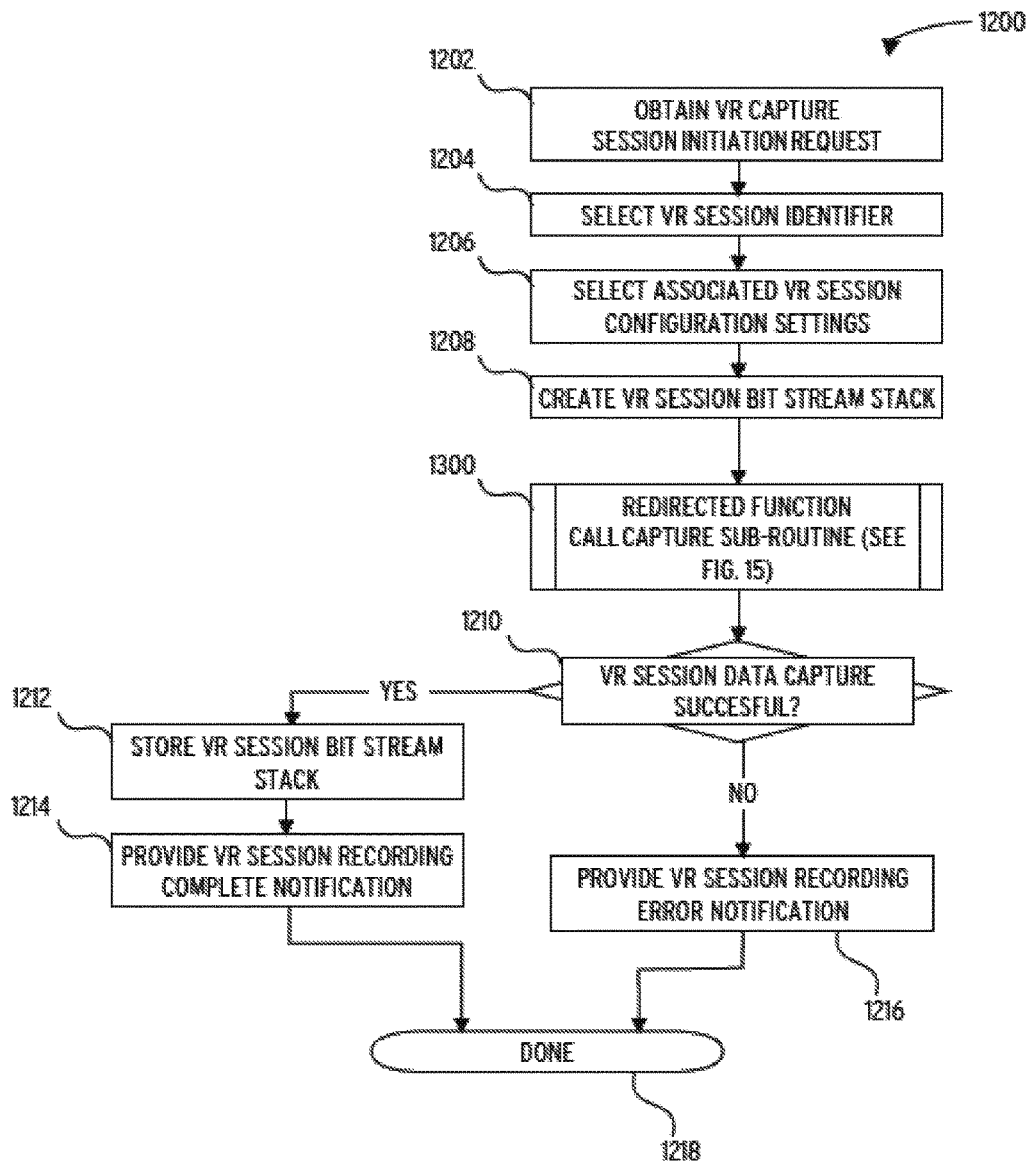
FIG. 12 illustrates a flow diagram of an exemplary virtual reality session capture routine in accordance with at least one embodiment.

FIG. 12 illustrates a VR session capture routine 1200 such as may be performed by VR session capture component 238 operating on client VR capture device 200.

In execution block 1202, VR session capture routine 1200 obtains a VR capture session initiation request.

In execution block 1204, VR session capture routine 1200 may select a VR capture session identifier and associate the VR capture session identifier with the obtained VR session capture initiation request.

In execution block 1206, VR session capture routine 1200 may select initial VR capture session configuration settings, such an initial positional update sample rate, describe below, and may associate the initial VR session configuration settings with the VR capture session identifier.

In execution block 1208, VR session capture routine 1200 may instantiate a VR capture session bit stream stack for storing captured VR session data and associate the VR capture session bit stream stack with the VR capture session identifier.

VR session capture routine 1200 may then call a graphics engine function call capture sub-routine 1300, described below in reference to FIG. 13. Graphics engine function call capture sub-routine 1300 will terminate after it has completed capturing the VR session.

At decision block 1210, if the VR session data capture is successful, then VR session capture routine 1200 may proceed to execution block 1214 and provide a VR session capture complete notification, e.g. VR program 234; otherwise, if the VR session data capture is unsuccessful, then VR session capture routine 1200 may proceed to execution block 1216 and provide a VR session capture error notification, e.g. to VR program 234.

VR session capture routine 1200 ends at termination block 1218.

A Graphics Engine Function Call Capture Sub-Routine

Figure 13:
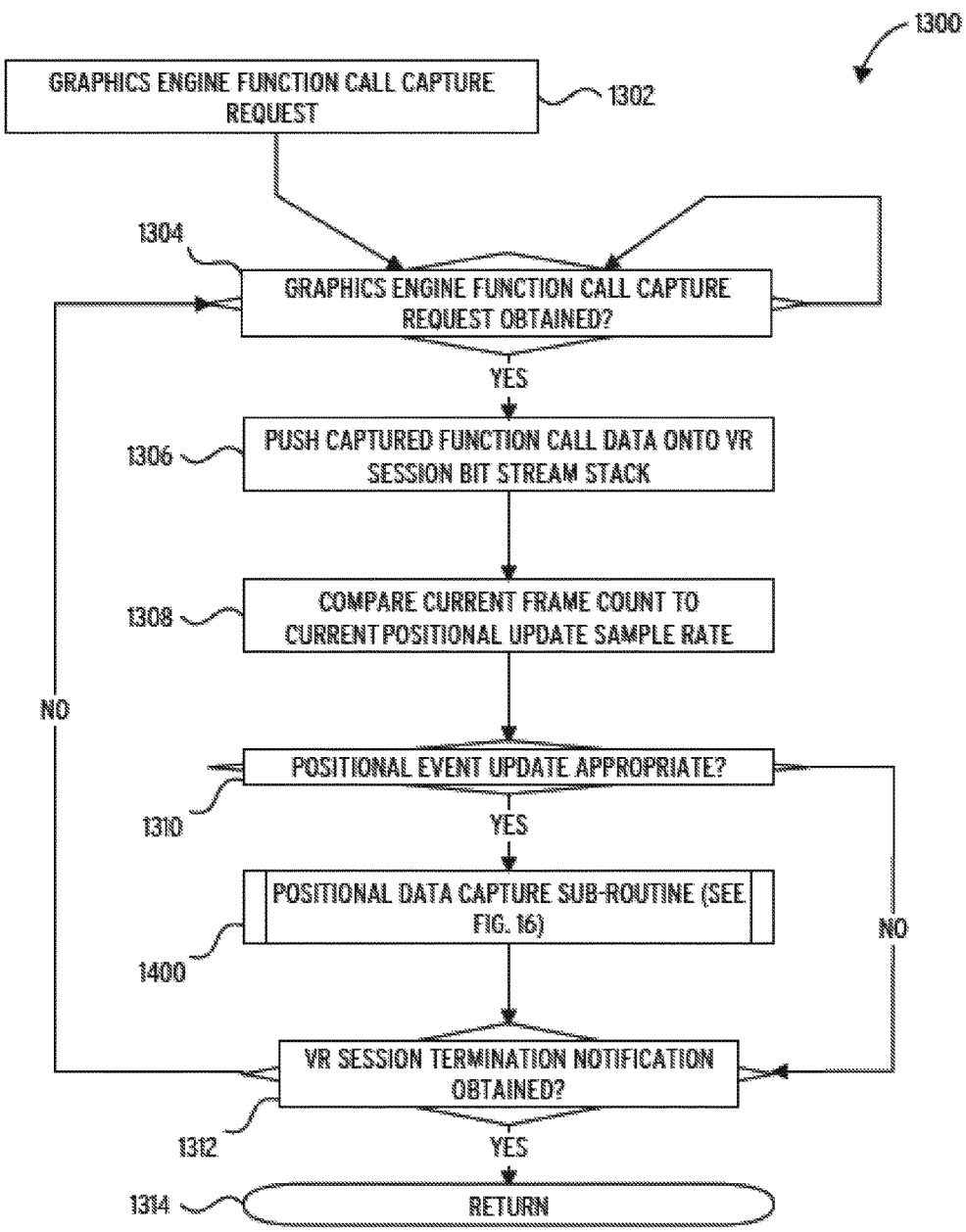
FIG. 13 illustrates a flow diagram of an exemplary graphics engine function call capture sub-routine in accordance with at least one embodiment.

FIG. 13 illustrates a graphics engine function call capture sub-routine 1300 such as may be performed by VR session capture component 238 operating on client VR capture device 200. Graphics engine function call capture sub-routine 1300 may be initiated by VR session capture routine 1200 in response to a graphics-engine function call capture request.

In execution block 1302, graphics engine function call capture sub-routine 1300 may obtain a graphics engine function call capture request, e.g. from VR session capture routine 1200. The graphics engine function call capture request may include a VR capture session identifier.

At decision block 1304, if graphics engine function call capture sub-routine 1300 obtains a graphics engine function call capture request, e.g. from VR program 234 and/or graphics engine 236, then graphics engine function call capture sub-routine 1300 may proceed to execution block 1306.

In execution block 1306, graphics engine function call capture sub-routine 1300 may push graphics engine function call data obtained in the graphics engine function call capture request (e.g. the name of the called function, the parameters passed to the function, the current frame count of the VR session, and the like) onto the VR session bit stream stack.

In execution block 1308, graphics engine function call capture sub-routine 1300 may compare a current frame count of the VR session and a current value of the positional update sample rate to determine if a positional event update is appropriate. For example, if the current value of the positional update sample rate is three (indicating graphics engine function call capture sub-routine 1300 should obtain positional updates every three frames), it has been two frames since the last positional update, and the graphics engine function capture request obtained at decision block 1304 indicates the VR session has advanced to a new frame, then a positional event update may be appropriate.

At decision block 1310, if a positional event update is appropriate graphics engine function call capture sub-routine 1300 may call positional data capture sub-routine 1400; otherwise graphics engine function call capture sub-routine 1300 may proceed to decision block 1312.

At decision block 1312, if a VR session termination notification is obtained, e.g. from VR program 234 or graphics, then graphics engine function call capture sub-routine 1300 may proceed return block 1314; otherwise graphics engine function call capture sub-routine 1300 may proceed back to decision block 1304 and wait for another graphics engine function call capture request.

Graphics engine function call capture sub-routine 1300 terminates at return block 1314, e.g. by returning to VR session capture routine 1200.

A Positional Data Capture Sub-Routine

Figure 14:
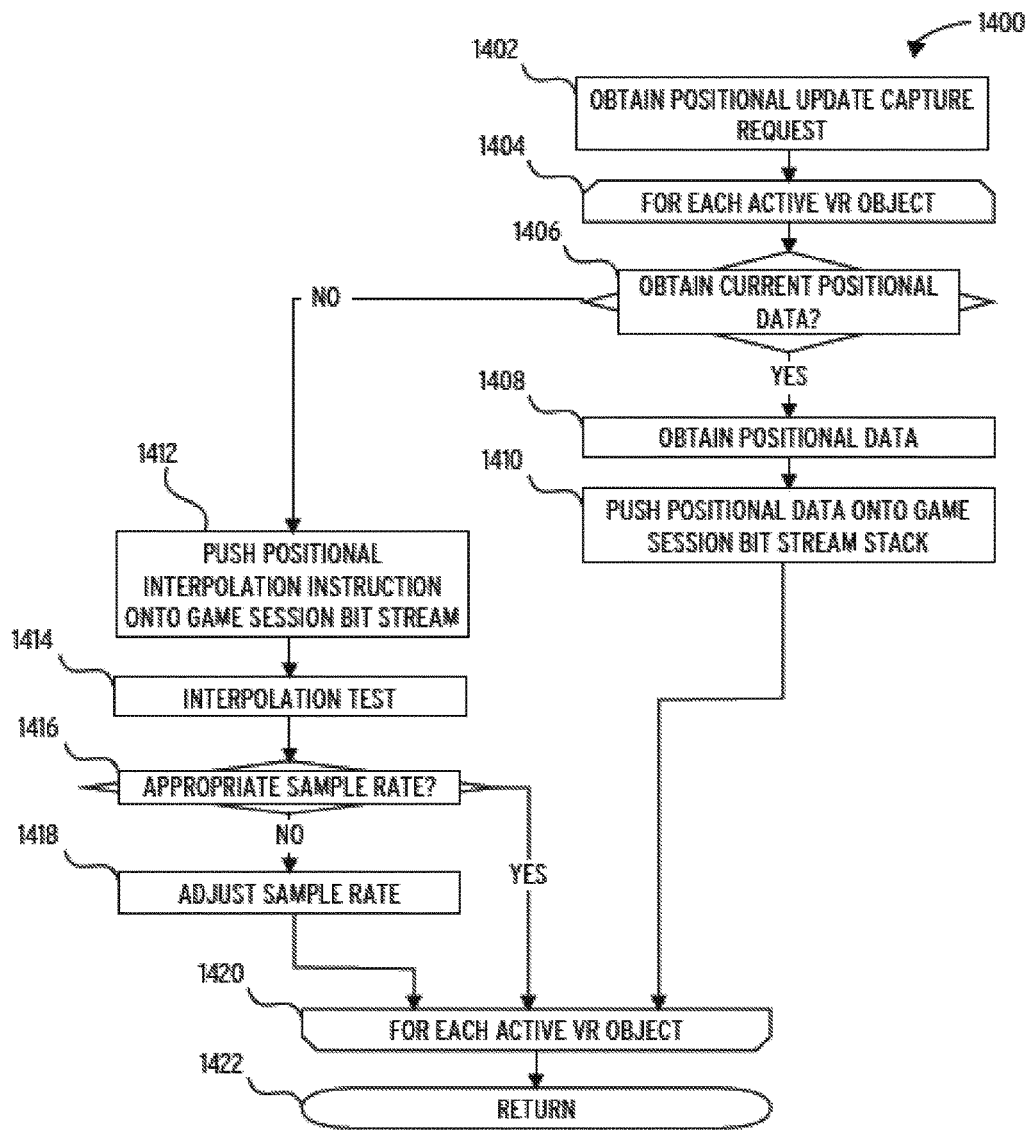
FIG. 14 illustrates a flow diagram of an exemplary positional data capture sub-routine in accordance with at least one embodiment.

FIG. 14 illustrates a positional data capture sub-routine such as may be performed by VR session capture component 238 operating on client VR capture device 200. Positional data capture sub-routine 1400 may be initiated by a positional event capture request obtained from graphics engine function call capture sub-routine 1300.

In block 1402, positional data capture sub-routine 1400 may obtain a positional event capture request. The positional event capture request may include a VR capture session identifier.

At opening loop block 1404, positional data capture sub-routine 1400 may process each positional event identifier in a positional event identifier set associated with the VR capture session identifier in turn.

At decision block 1406, if the current value of the temporal interval counter associated with the VR capture session identifier corresponds to a sample interval for the current positional event identifier, then positional data capture sub-routine 1400 may proceed to block 1408; otherwise positional data capture sub-routine 1400 may proceed to closing loop block 1420. The sample rate for a positional event identifier may, e.g., be stored in the positional event identifier set and may have an initial default value, such as thirty frames per second.

In block 1408, positional data capture sub-routine 1400 obtains positional data for the positional event associated with the current positional event identifier and the current temporal interval, e.g. by querying a rendering thread, such as rendering thread 506.

In block 1410, positional data capture sub-routine 1400 may store the positional data, e.g. in memory 404 and/or data store 104, associated with the VR capture session identifier and the current value of the temporal interval counter.

In block 1414, positional data capture sub-routine 1400 may perform an interpolation test on the positional data for the current positional event identifier to ensure an appropriate amount of data is being collected to ensure reliable replay.

At decision block 1416, if the results of the interpolation test in block 1012 indicate the current sample rate associated with the current positional event identifier is appropriate, then positional data capture sub-routine 1400 may proceed to closing loop block 1420; otherwise, positional data capture sub-routine 1400 may proceed to block 1418.

In block 1418, positional data capture sub-routine 1400 may adjust the sample rate for the current positional event based on the results of decision block 1416.

At closing loop block 1420, positional data capture sub-routine 1400 may iterate back to 1004 to process the next positional event identifier in the positional event set.

Positional data capture sub-routine 1400 terminates, e.g. by returning to graphics engine function call capture sub-routine 1300, at return block 1422.

A Virtual Reality Replay Session Routine

Figure 15:
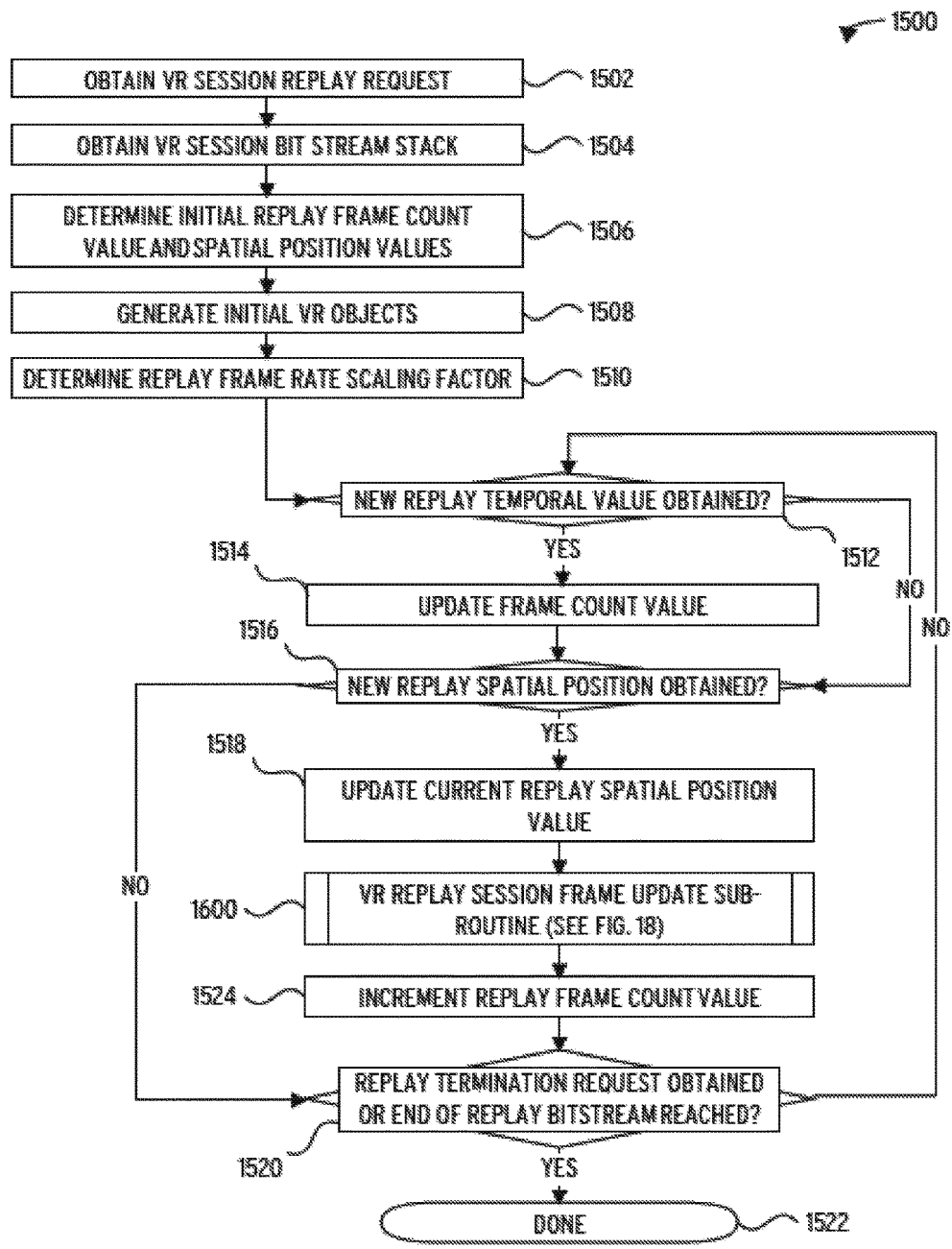
FIG. 15 illustrates a flow diagram of an exemplary virtual reality replay session routine in accordance with at least one embodiment.

FIG. 15 illustrates a VR replay session routine 1500 such as may be performed by an instantiation of VR session replay component 340 operating on client VR replay device 300. Virtual reality application 320 may initiate VR replay session routine 1500 in response to obtaining a VR replay session request, e.g. input obtained from virtual reality input device(s) (optional) 312.

In block 1502, VR replay session routine 1500 may obtain a VR session replay request. The VR session replay request may include a VR session identifier. VR replay session routine 1500 may associate a replay session identifier with the VR session replay request.

In block 1504, VR replay session routine 1500 may obtain a captured VR session bit stream stack associated with the VR session identifier, e.g. from data store 104 via network 102 or from computer readable storage medium 322, and may load at least part of the captured VR session bit stream stack into memory 304 and associate the captured VR session bit stream stack with the replay VR session identifier.

In block 1506, VR replay session routine 1500 may determine an initial replay frame count value, i.e. which frame of the captured VR session to begin the VR replay session with, which may default to zero unless otherwise specified, e.g. in the VR session replay request, and spectator position values corresponding to the replay spectator's initial spatial position and viewing orientation within the VR replay session.

In block 1510, VR replay session routine 1500 may determine a replay frame rate scaling factor to be applied to the current VR replay session. For example, the VR replay session may have been originally captured at ninety frames per second but the VR session replay request may specify a maximum replay frame rate of thirty frames per second, in which case the replay frame rate scaling factor for the VR replay session will have a value of three. In such a scenario, during the VR replay session, VR replay session routine 1500 will only render one replay frame of every three captured frames. Note that if the virtual reality session is being simultaneously replayed for multiple spectators, a different frame rate scaling factor may be specified for each replay stream.

At decision block 1512, if a new temporal replay value has been obtained, e.g. indicating a desire move to a new temporal position in the captured VR session, then VR replay session routine 1500 may proceed to block 1514; otherwise VR replay session routine 1500 may proceed to decision block 1516.

In block 1514, VR replay session routine 1500 updates the frame count value to account for the new temporal reply value, with the new temporal replay value. For example, if the new temporal . . . indicates a desire to move backwards (or forwards) by five seconds, and the VR replay session is being generated at ninety frames per second, then the frame count value may be reduced (or increased) by four hundred and fifty (five seconds multiplied by ninety frames per second).

At decision block 1516, if data relating to a new desired spectator spatial position and/or viewing orientation has been obtained, e.g. via input obtained from virtual reality input device(s) (optional) 312, then VR replay session routine 1500 may proceed to block 1518; otherwise VR replay session routine 1500 may proceed to decision block 1520.

In block 1518, VR replay session routine 1500 updates the current spectator spatial position value and/or viewing orientation with the new spectator spatial position value and/or viewing orientation.

VR replay session routine 1500 may then call VR replay session frame update sub-routine 1600, described below in reference to FIG. 16.

In block 1524, VR replay session routine 1500 increments the frame count value according to the scaling factor value determined in block 1510.

At decision block 1520, if a replay termination request has been obtained, e.g. via input obtained from virtual reality input device(s) (optional) 312, or the current frame count value exceeds the maximum frame count value associated with the game session bitstream stack, then VR replay session routine 1500 may proceed to termination block 1522; otherwise VR replay session routine 1500 proceeds back to block 1510.

VR replay session routine 1500 may end at termination block 1522.

A Virtual Reality Replay Session Frame Update Sub-Routine

Figure 16:
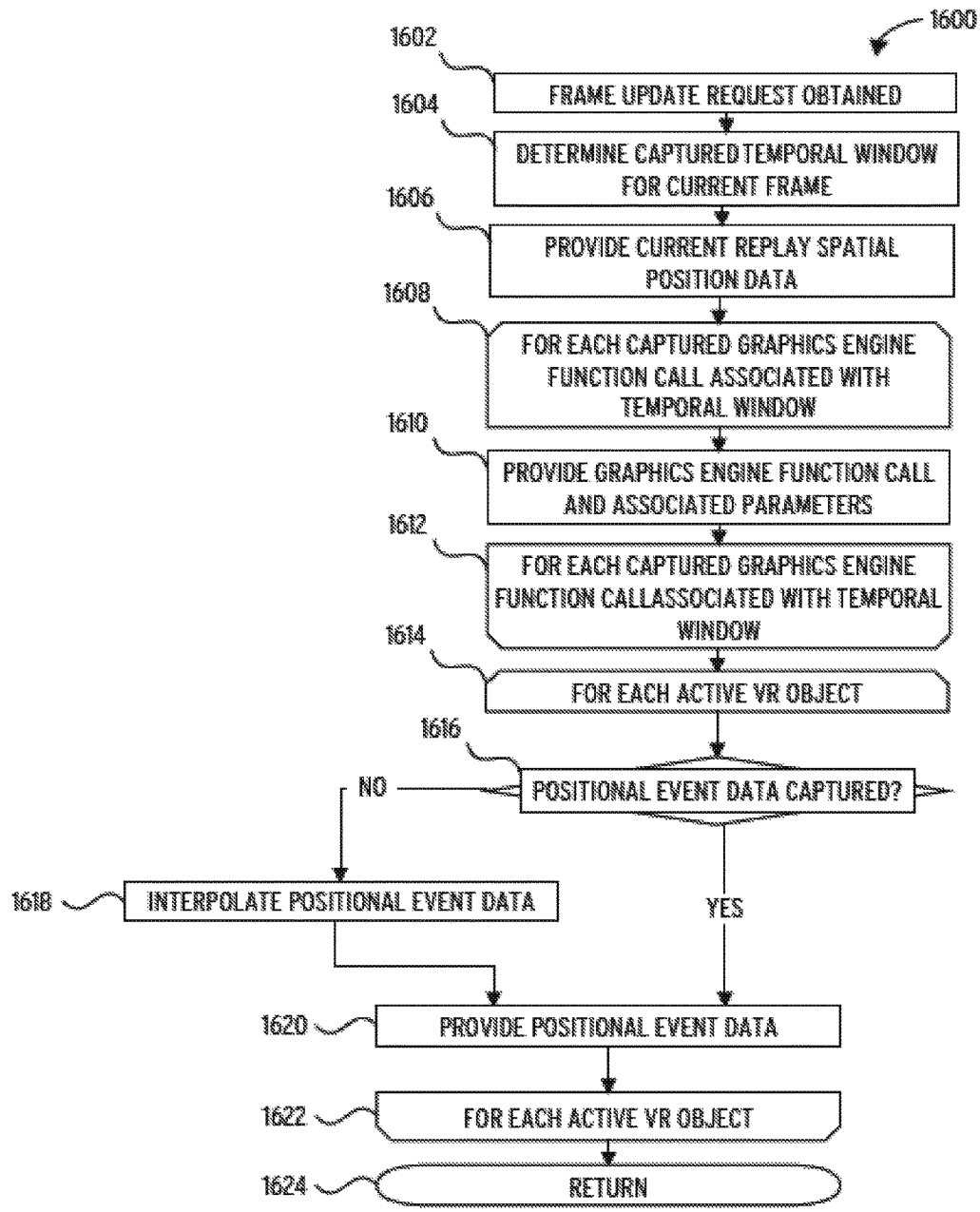
FIG. 16 illustrates a flow diagram of an exemplary virtual reality replay session frame update sub-routine in accordance with at least one embodiment.

FIG. 16 illustrates a VR replay session frame update sub-routine 1600 such as may be performed by virtual reality session replay service 422 operating on virtual reality session capture/replay server 400 in furtherance of a VR gaming replay provider.

In execution block 1602, VR replay session frame update sub-routine 1600 may obtain a frame update request, e.g. from VR replay session routine 1500. The frame update request may include a current frame count value and a frame rate scaling factor.

In execution block 1604, VR replay session frame update sub-routine 1600 may determine a current captured temporal window associated with the current frame update request. For example, if the frame rate scaling factor is three, the current temporal window may be three frames of the captured VR session because VR replay session frame update sub-routine 1600 must account for all state changes to the active VR objects of the current virtual reality scene over three frames of the captured VR session before rendering the next frame of the VR replay session.

In execution block 1606, VR replay session frame update sub-routine 1600 may provide graphics engine 336 with the current spectator spatial position and viewing orientation.

At opening loop block 1608, VR replay session frame update sub-routine 1600 may process each captured graphics engine function call associated with the current temporal window in turn.

In execution block 1610, VR replay session frame update sub-routine 1600 may provide graphics engine 336 with a graphics engine function call corresponding to the current captured graphics engine function call.

At closing loop block 1612, VR replay session frame update sub-routine 1600 may loop back to opening loop block 1608 and process the next captured graphics engine function call associated with the current temporal window, if any.

At opening loop block 1614, VR replay session frame update sub-routine 1600 may process each active VR object associated with the current temporal window in turn.

At decision block 1616, if positional event data for the current VR object was captured for the current frame, then VR replay session frame update sub-routine 1600 may proceed to execution block 1620, otherwise, VR replay session frame update sub-routine 1600 may proceed to execution block 1618.

In execution block 1618, VR replay session frame update sub-routine 1600 may interpolate positional event data for the current frame using captured positional event data from previous and/or future frames.

In block 1820, positional event data, either captured or interpolated, for the current VR object may be provided to graphics engine graphics engine 336

At closing loop block 1622, VR replay session frame update sub-routine 1600 iterates back to opening loop block 1614 to process the next active VR object.

VR replay session frame update sub-routine 1600 terminates, e.g. by returning to VR replay session routine 1500, at return block 1624.

The Methods and Systems Exemplified by the Above Embodiments

The present methods and systems include a client virtual reality device useful in generating virtual reality replay streams, such virtual reality replay streams corresponding to virtual reality sessions generated by the client virtual reality device. The client virtual reality device may include at least one computing processing unit; a network interface; a computer readable storage medium; and memory in data communication with the at least one computer processing unit. The memory may contain executable instructions for causing the at least one computing processing unit to perform a first method. The first method includes instantiating, on the client virtual reality device, a virtual reality session capture thread associated with a virtual reality session being generated by the client virtual reality device; capturing, by the virtual reality session capture thread, graphics engine function call data for each of a plurality of graphics engine function calls made during the virtual reality session; obtaining, by the virtual reality session capture thread, a virtual reality session termination communication, the virtual reality session termination communication indicating an end of the virtual reality session; creating a virtual reality replay stream corresponding to the plurality of virtual reality game session data records and being associated with a virtual reality replay session identifier corresponding to the virtual reality session; and saving the virtual reality replay stream to the computer readable storage medium.

The present methods and systems may also include a variation on the client virtual reality device described above, wherein the virtual reality replay stream includes graphics engine function call data corresponding to at least 90% of graphics engine function calls made during the virtual reality session.

The present methods and systems may also include a variation on the client virtual reality device(s) described above, wherein the capturing step includes obtaining, by the virtual reality session capture thread, a graphics engine function call capture request, the graphics engine function call capture request including graphics engine function call data corresponding to at least one graphics engine function call of the virtual reality session.

The present methods and systems may also include a variation on the client virtual reality device(s) described above, wherein the capturing step includes providing the at least one graphics engine function call to a graphics engine rendering thread instantiated on the client virtual reality device.

The present methods and systems may also include a variation on the client virtual reality device(s) described above, wherein the capturing step includes obtaining a sequence of graphics engine function call capture requests, each of the sequence of graphics engine function call capture requests including graphics engine function call data corresponding to a graphics engine function call provided to a graphics engine rendering thread instantiated on the client virtual reality device, and, for each of the sequence of graphics engine function call capture requests, pushing the graphics engine function call data onto a virtual reality session bit stream stack.

The present methods and systems may also include a variation on the client virtual reality device(s) described above, wherein the first method includes providing the virtual reality replay stream to a remote virtual reality session capture and replay server via the network interface.

The present methods and systems may also include a variation on the client virtual reality device(s) described above wherein the at least one computing processing unit includes a central processing unit and a graphics processing unit.

The present methods and systems may also include a variation on the client virtual reality device(s) described above, further including at least one virtual reality input device and at least one virtual reality display device.

The present methods and systems also include a client virtual reality device useful in generating virtual reality replay streams, such virtual reality replay streams corresponding to virtual reality sessions generated by the client virtual reality device. The client virtual reality device may include at least one computing processing unit; a network interface; a computer readable storage medium; and memory in data communication with the at least one computer processing unit. The memory may contain executable instructions for causing the at least one computing processing unit to perform a second method. The second method includes instantiating, on the client virtual reality device, a virtual reality session capture thread associated with a virtual reality session being generated by the client virtual reality device; providing, by the virtual reality session capture thread, a plurality of positional update requests to a graphics engine rendering thread instantiated on the client virtual reality device and associated with the virtual reality session; obtaining, by the virtual reality session capture thread, positional update data corresponding to a plurality of virtual reality objects associated with the virtual reality session, the positional update data corresponding to a current position and orientation of the plurality of virtual reality objects within the virtual reality session; obtaining, by the virtual reality session capture thread, a virtual reality session termination communication, the virtual reality session termination communication indicating an end of the virtual reality session; creating a virtual reality replay stream corresponding to the plurality of virtual reality game session data records and being associated with a virtual reality replay session identifier corresponding to the virtual reality session; and saving the virtual reality replay stream to the computer readable storage medium, wherein, prior to obtaining the virtual reality session termination communication, the of steps providing a plurality of positional update requests to a graphics engine rendering thread instantiated on the client virtual reality device and obtaining positional update data corresponding to a plurality of virtual reality objects associated with the virtual reality session are repeated in accordance with a positional update sample rate associated with the virtual reality session capture thread.

The present methods and systems may also include a variation on the second method, wherein the step of instantiating a virtual reality session capture thread includes determining a frame rate associated with the virtual reality session and the positional update sample rate associated with the virtual reality session capture thread and providing a plurality of positional update requests to the graphics engine rendering thread includes monitoring a current frame count of the virtual reality session and determining when to provide a positional update request of the plurality of positional update requests based at least in part on the positional update sample rate and the current frame count.

The present methods and systems may also include a variation on the second method, wherein the second method also includes providing the virtual reality replay stream to a remote virtual reality session capture and replay server via the network interface.

The present methods and systems may also include a variation on the client virtual reality device(s) described above, wherein the at least one computing processing unit comprises a central processing unit and a graphics processing unit.

The present methods and systems may also include a variation on the client virtual reality device(s) described above, wherein the device also includes at least one virtual reality input device and at least one virtual reality display device.

The present methods and systems also include a client virtual reality device useful in generating virtual reality replay streams, such virtual reality replay streams corresponding to virtual reality sessions generated by the client virtual reality device. The client virtual reality device may include at least one computing processing unit; a network interface; a computer readable storage medium; and memory in data communication with the at least one computer processing unit. The memory may contain executable instructions for causing the at least one computing processing unit to perform a third method. The third method includes instantiating, on the client virtual reality device, a virtual reality session capture thread associated with a virtual reality session being generated by the client virtual reality device; obtaining, by the virtual reality session capture thread, a graphics engine function call capture request, the graphics engine function call capture request including graphics engine function call data corresponding to at least one graphics engine function call of the virtual reality session; providing, by the virtual reality session capture thread, a plurality of positional update requests to a graphics engine rendering thread instantiated on the client virtual reality device and associated with the virtual reality session; obtaining, by the virtual reality session capture thread, positional update data corresponding to a plurality of virtual reality objects associated with the virtual reality session, the positional update data corresponding to a current position and orientation of the plurality of virtual reality objects within the virtual reality session; obtaining, by the virtual reality session capture thread, a virtual reality session termination communication, the virtual reality session termination communication indicating an end of the virtual reality session; creating a virtual reality replay stream corresponding to the plurality of virtual reality game session data records and being associated with a virtual reality replay session identifier corresponding to the virtual reality session; and saving the virtual reality replay stream to the computer readable storage medium; and wherein, prior to the step of obtaining the virtual reality session termination communication, the steps of providing a plurality of positional update requests to a graphics engine rendering thread and obtaining positional update data corresponding to the plurality of virtual reality objects are repeated in accordance with a positional update sample rate associated with the virtual reality session capture thread.

The present methods and systems may also include a variation on the third method, wherein the step of instantiating the virtual reality session capture thread includes determining a frame rate associated with the virtual reality session and the positional update sample rate associated with the virtual reality session capture thread and the step of providing the plurality of positional update requests includes monitoring a current frame count of the virtual reality session and determining when to provide a positional update request of the plurality of positional update requests based at least in part on the positional update sample rate and the current frame count.

The present methods and systems may also include a variation on the third method, wherein the step of obtaining the graphics engine function call capture request includes obtaining a sequence of graphics engine function call capture requests, each of the sequence of graphics engine function call capture requests including graphics engine function call data corresponding to a graphics engine function call provided to the graphics engine rendering thread, and, for each of the sequence of graphics engine function call capture requests, pushing the graphics engine function call data onto a virtual reality session bit stream stack.

The present methods and systems may also include a variation on the third method, wherein the step of obtaining the graphics engine function call capture request includes providing the at least one graphics engine function call to the graphics engine rendering thread.

The present methods and systems may also include a variation on the third method, wherein the third method includes providing the virtual reality replay stream to a remote virtual reality session capture and replay server via the network interface.

The present methods and systems may also include a variation on the client virtual reality device(s) described above, wherein the at least one computing processing unit comprises a central processing unit and a graphics processing unit.

The present methods and systems may also include a variation on the client virtual reality device(s) described above, also including at least one virtual reality input device and at least one virtual reality display device.

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein. In an additional aspect of the present systems and methods, additional data may be added to a modified virtual reality session bitstream after it has been captured such that additional information regarding the virtual reality session is available to the spectator.

For example, in the context of a VR replay session of a simulated combat game, a spectator may pause playback and focus on a particular VR object, e.g. a bullet in flight across the virtual reality scene, which may trigger a look up operation to provide data related to the bullet not captured during the original game session, such as which player (or computer generated character) fired the bullet, its trajectory, potential damage, etc.

In another aspect of the present systems and methods, multiple client replay devices may engage in a networked VR replay session, whereby each client replay device may provide spectator state data to the various other client replay devices to be dynamically incorporated into each replay session, thereby allowing the various spectators to see and interact with representations of each other during the replay virtual reality session.

The invention claimed is:

1. A client virtual reality device useful in generating virtual reality replay streams, virtual reality replay streams corresponding to virtual reality sessions generated by the client virtual reality device, the client virtual reality device comprising:
   at least one computing processing unit;
   a network interface;
   a computer readable storage medium; and
   memory in data communication with said at least one computer processing unit and containing executable instructions for causing said at least one computing processing unit to perform a method comprising:
   (a) instantiating, on the client virtual reality device, a virtual reality session capture thread associated with a virtual reality session being generated by the client virtual reality device;
   (b) providing, by said virtual reality session capture thread, a plurality of positional update requests to a graphics engine rendering thread instantiated on the client virtual reality device and associated with said virtual reality session;
   (c) obtaining, by said virtual reality session capture thread, positional update data corresponding to a plurality of virtual reality objects associated with said virtual reality session, said positional update data corresponding to a current position and orientation of said plurality of virtual reality objects within said virtual reality session;
   (d) obtaining, by said virtual reality session capture thread, a virtual reality session termination communication, said virtual reality session termination communication indicating an end of said virtual reality session;
   (e) creating a virtual reality replay stream corresponding to said plurality of virtual reality game session data records and being associated with a virtual reality replay session identifier corresponding to the virtual reality session; and
   (f) saving said virtual reality replay stream to said computer readable storage medium; and
   wherein, prior to step (d), steps (b) and (c) are repeated in accordance with a positional update sample rate associated with said virtual reality session capture thread, step (a) includes determining a frame rate associated with said virtual reality session and said positional update sample rate associated with said virtual reality session capture thread and step (b) includes monitoring a current frame count of said virtual reality session and determining when to provide a positional update request of said plurality of positional update requests based at least in part on said positional update sample rate and said current frame count.

2. The client virtual reality device of claim 1, wherein said method further comprises providing said virtual reality replay stream to a remote virtual reality session capture and replay server via said network interface.

3. The client virtual reality device of claim 1, wherein said at least one computing processing unit comprises a central processing unit and a graphics processing unit.

4. The client virtual reality device of claim 1, further comprising at least one virtual reality input device and at least one virtual reality display device.

5. The client virtual reality device of claim 1, further comprising capturing, by said virtual reality session capture thread, graphics engine function call data for each of a plurality of graphics engine function calls made during said virtual reality session.

6. The client virtual reality device of claim 5, wherein said virtual reality replay stream includes graphics engine function call data corresponding to at least 90% of graphics engine function calls made during said virtual reality session.

7. The client virtual reality device of claim 5, wherein capturing, by said virtual reality session capture thread, graphics engine function call data for each of a plurality of graphics engine function calls made during said virtual reality session includes obtaining, by said virtual reality session capture thread, a graphics engine function call capture request, said graphics engine function call capture request including graphics engine function call data corresponding to at least one graphics engine function call of said virtual reality session.

8. The client virtual reality device of claim 7, wherein capturing, by said virtual reality session capture thread, graphics engine function call data for each of a plurality of graphics engine function calls made during said virtual reality session includes providing said at least one graphics engine function call to a graphics engine rendering thread instantiated on the client virtual reality device.

9. The client virtual reality device of claim 5, wherein capturing, by said virtual reality session capture thread, graphics engine function call data for each of a plurality of graphics engine function calls made during said virtual reality session includes obtaining a sequence of graphics engine function call capture requests, each of said sequence of graphics engine function call capture requests including graphics engine function call data corresponding to a graphics engine function call provided to a graphics engine rendering thread instantiated on the client virtual reality device, and, for each of said sequence of graphics engine function call capture requests, pushing said graphics engine function call data onto a virtual reality session bit stream stack.

10. A client virtual reality device useful in generating virtual reality replay streams, virtual reality replay streams corresponding to virtual reality sessions generated by the client virtual reality device, the client virtual reality device comprising:
- at least one computing processing unit;
- a network interface;
- a computer readable storage medium; and
- memory in data communication with said at least one computer processing unit and containing executable instructions for causing said at least one computing processing unit to perform a method comprising:
  - (a) instantiating, on the client virtual reality device, a virtual reality session capture thread associated with a virtual reality session being generated by the client virtual reality device;
  - (b) obtaining, by said virtual reality session capture thread, a graphics engine function call capture request, said graphics engine function call capture request including graphics engine function call data corresponding to at least one graphics engine function call of said virtual reality session;
  - (c) providing, by said virtual reality session capture thread, a plurality of positional update requests to a graphics engine rendering thread instantiated on the client virtual reality device and associated with said virtual reality session;
  - (d) obtaining, by said virtual reality session capture thread, positional update data corresponding to a plurality of virtual reality objects associated with said virtual reality session, said positional update data corresponding to a current position and orientation of said plurality of virtual reality objects within said virtual reality session;
  - (e) obtaining, by said virtual reality session capture thread, a virtual reality session termination communication, said virtual reality session termination communication indicating an end of said virtual reality session;
  - (f) creating a virtual reality replay stream corresponding to said plurality of virtual reality game session data records and being associated with a virtual reality replay session identifier corresponding to the virtual reality session; and
  - (g) saving said virtual reality replay stream to said computer readable storage medium; and
  - wherein, prior to step (e), (c), and (d) are repeated in accordance with a positional update sample rate associated with said virtual reality session capture thread, step (a) includes determining a frame rate associated with said virtual reality session and said positional update sample rate associated with said virtual reality session capture thread and step (c) includes monitoring a current frame count of said virtual reality session and determining when to provide a positional update request of said plurality of positional update requests based at least in part on said positional update sample rate and said current frame count.

11. The client virtual reality device of claim 10, wherein step (b) comprises obtaining a sequence of graphics engine function call capture requests, each of said sequence of graphics engine function call capture requests including graphics engine function call data corresponding to a graphics engine function call provided to said graphics engine rendering thread, and, for each of said sequence of graphics engine function call capture requests, pushing said graphics engine function call data onto a virtual reality session bit stream stack.

12. The client virtual reality device of claim 10, wherein step (b) further comprises providing said at least one graphics engine function call to said graphics engine rendering thread.

13. The client virtual reality device of claim 10, wherein said method further comprises providing said virtual reality replay stream to a remote virtual reality session capture and replay server via said network interface.

14. The client virtual reality device of claim 10, wherein said at least one computing processing unit comprises a central processing unit and a graphics processing unit.

15. The client virtual reality device of claim 10, further comprising at least one virtual reality input device and at least one virtual reality display device.

16. The client virtual reality device of claim 10, further comprising capturing, by said virtual reality session capture thread, graphics engine function call data for each of a plurality of graphics engine function calls made during said virtual reality session.

17. The client virtual reality device of claim 16, wherein said virtual reality replay stream includes graphics engine function call data corresponding to at least 90% of graphics engine function calls made during said virtual reality session.

18. The client virtual reality device of claim 16, wherein capturing, by said virtual reality session capture thread, graphics engine function call data for each of a plurality of graphics engine function calls made during said virtual reality session includes obtaining, by said virtual reality session capture thread, a graphics engine function call capture request, said graphics engine function call capture request including graphics engine function call data corresponding to at least one graphics engine function call of said virtual reality session.

19. The client virtual reality device of claim 18, wherein capturing, by said virtual reality session capture thread, graphics engine function call data for each of a plurality of graphics engine function calls made during said virtual reality session includes providing said at least one graphics engine function call to a graphics engine rendering thread instantiated on the client virtual reality device.

20. The client virtual reality device of claim 16, wherein capturing, by said virtual reality session capture thread, graphics engine function call data for each of a plurality of graphics engine function calls made during said virtual reality session includes obtaining a sequence of graphics engine function call capture requests, each of said sequence of graphics engine function call capture requests including graphics engine function call data corresponding to a graphics engine function call provided to a graphics engine rendering thread instantiated on the client virtual reality device, and, for each of said sequence of graphics engine function call capture requests, pushing said graphics engine function call data onto a virtual reality session bit stream stack.

* * * * *